US009516625B2

(12) United States Patent
Zakrzewski

(10) Patent No.: US 9,516,625 B2
(45) Date of Patent: Dec. 6, 2016

(54) METHODS AND APPARATUSES FOR COMMUNICATING CONTENT DATA TO A COMMUNICATIONS TERMINAL FROM A LOCAL DATA STORE

(75) Inventor: Robert Zakrzewski, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 127 days.

(21) Appl. No.: 14/343,103

(22) PCT Filed: Sep. 11, 2012

(86) PCT No.: PCT/GB2012/052238
§ 371 (c)(1),
(2), (4) Date: Mar. 6, 2014

(87) PCT Pub. No.: WO2013/038168
PCT Pub. Date: Mar. 21, 2013

(65) Prior Publication Data
US 2014/0226602 A1 Aug. 14, 2014

(30) Foreign Application Priority Data

Sep. 12, 2011 (GB) .................................. 1115745.0
Sep. 12, 2011 (GB) .................................. 1115746.8

(51) Int. Cl.
*H04W 4/00* (2009.01)
*H04W 72/04* (2009.01)
(Continued)

(52) U.S. Cl.
CPC .............. *H04W 72/04* (2013.01); *H04L 49/15* (2013.01); *H04L 67/2842* (2013.01); *H04W 4/18* (2013.01); *H04W 88/08* (2013.01)

(58) Field of Classification Search
CPC .................................................. H04L 67/2842
See application file for complete search history.

(56) References Cited

U.S. PATENT DOCUMENTS 6,826,599 B1 11/2004 Shaffer et al.
6,941,338 B1 9/2005 Madsen
(Continued)

FOREIGN PATENT DOCUMENTS

EP 1 227 637 A2 7/2002
EP 2 329 385 A1 6/2011
(Continued)

OTHER PUBLICATIONS

U.S. Appl. No. 14/343,189, filed Mar. 6, 2014, Zakrzewski.
(Continued)

*Primary Examiner* — Maharishi Khirodhar
(74) *Attorney, Agent, or Firm* — Oblon, McClelland, Maier & Neustadt, L.L.P.

(57) ABSTRACT

A communications terminal is configured to receive content data from a mobile communications network. The mobile communications network includes a core network part including a plurality of infrastructure equipment, and a radio network part including a plurality of base stations for providing a wireless access interface for communicating data packets to or from communications terminal. The core network part or the radio network part includes a local data store having stored therein content data, which has been received from an applications server via the core network, and the communications terminal is configured to transmit a request to access the content data from the applications server to the mobile communications network, and to receive the content data from the local data store as if the content data had been communicated from the applications server.

15 Claims, 30 Drawing Sheets

(51) Int. Cl.
*H04W 4/18* (2009.01)
*H04L 29/08* (2006.01)
*H04L 12/933* (2013.01)
*H04W 88/08* (2009.01)

(56) References Cited

U.S. PATENT DOCUMENTS

| | | | |
|---|---|---|---|
| 8,111,630 B2* | 2/2012 | Kovvali | H04W 28/0231 370/252 |
| 8,717,945 B2* | 5/2014 | Burckart | H04L 12/1403 370/228 |
| 8,880,636 B2* | 11/2014 | Westberg | 709/203 |
| 2004/0087304 A1 | 5/2004 | Buddhikot et al. | |
| 2005/0102300 A1 | 5/2005 | Madsen | |
| 2006/0206586 A1* | 9/2006 | Ling | H04L 29/12113 709/219 |
| 2009/0291696 A1* | 11/2009 | Cortes | H04W 4/00 455/466 |
| 2010/0034089 A1 | 2/2010 | Kovvali et al. | |
| 2010/0177735 A1* | 7/2010 | Bihannic | H04N 21/2381 370/331 |
| 2011/0075675 A1* | 3/2011 | Koodli | H04L 12/14 370/401 |
| 2011/0141887 A1 | 6/2011 | Klein et al. | |
| 2012/0099533 A1 | 4/2012 | Kovvali et al. | |
| 2012/0287858 A1 | 11/2012 | Klein et al. | |
| 2013/0066936 A1* | 3/2013 | Krishnan | G06F 17/30 709/201 |

FOREIGN PATENT DOCUMENTS

| | | |
|---|---|---|
| EP | 2 403 290 A1 | 1/2012 |
| WO | WO 2005/034407 A2 | 4/2005 |
| WO | WO 2010/017308 A1 | 2/2010 |
| WO | WO 2011/116819 A1 | 9/2011 |

OTHER PUBLICATIONS

Search Report issued Jan. 12, 2012 in United Kingdom Patent Application No. GB1115745.0.
International Search Report issued Jun. 3, 2013 in PCT/GB2012/052238.
"3$^{rd}$ Generation Partnership Project; Technical Specification Group Services and System Aspects; Local IP Access and Selected IP Traffic Offload (LIPA-SIPTO)(Release 10)" 3GPP TR 23.829 Standard, vol. 10.0.0, XP050476492, Mar. 29, 2011, pp. 1-43.
Harri Holma, et al., "Basic System Architecture Configuration with only E-UTRAN Access Network" System Architecture Based on 3GPP SAE, LTE for UMTS OFDMA and SC-FDMA Based Radio Access, Apr. 2009, pp. 25-27 and Cover Page.

* cited by examiner

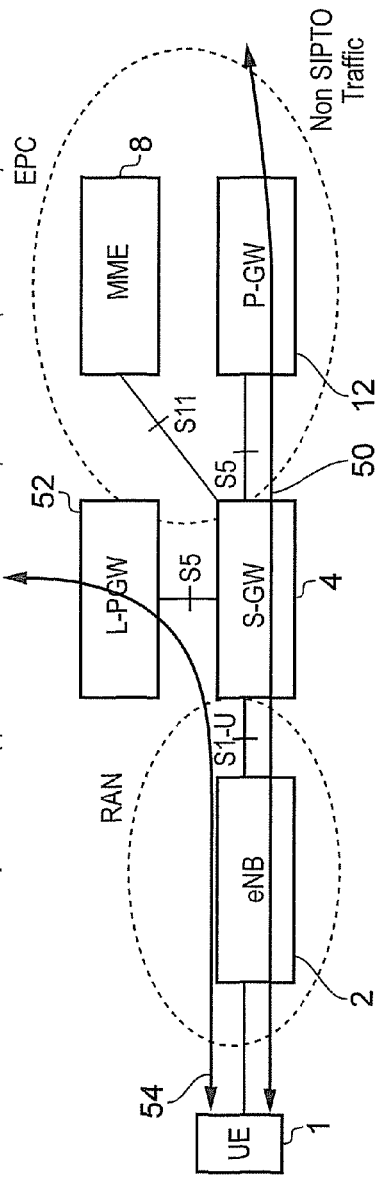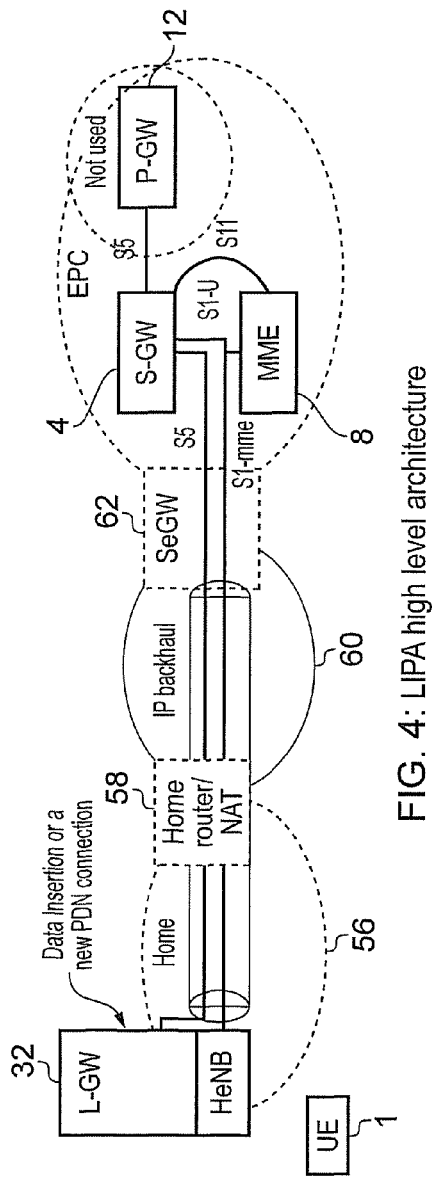
FIG. 3 SIPTO high level architecture
FIG. 4: LIPA high level architecture

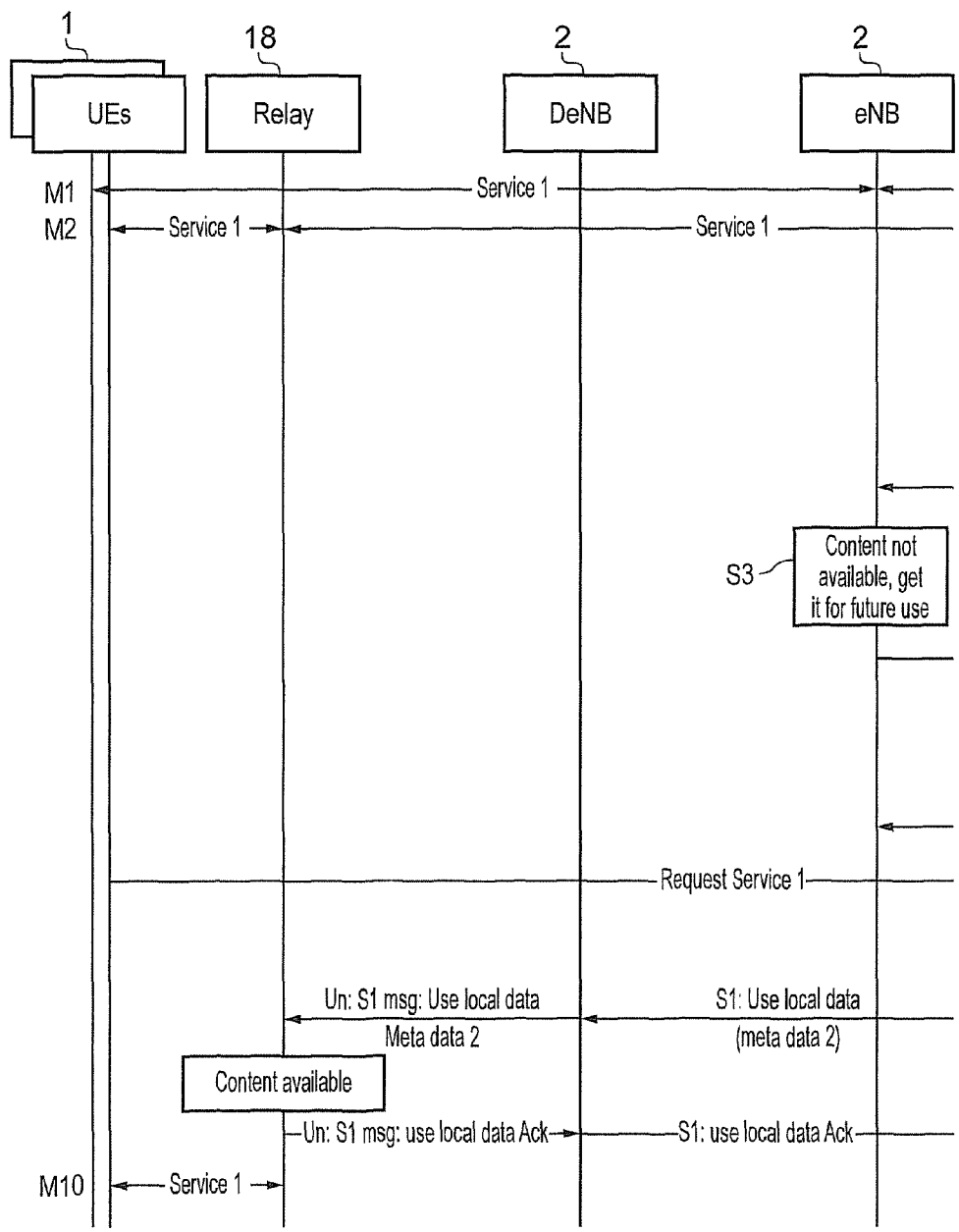
FIG. 7: Triggers at PDN-GW, Content Upload and retrieval

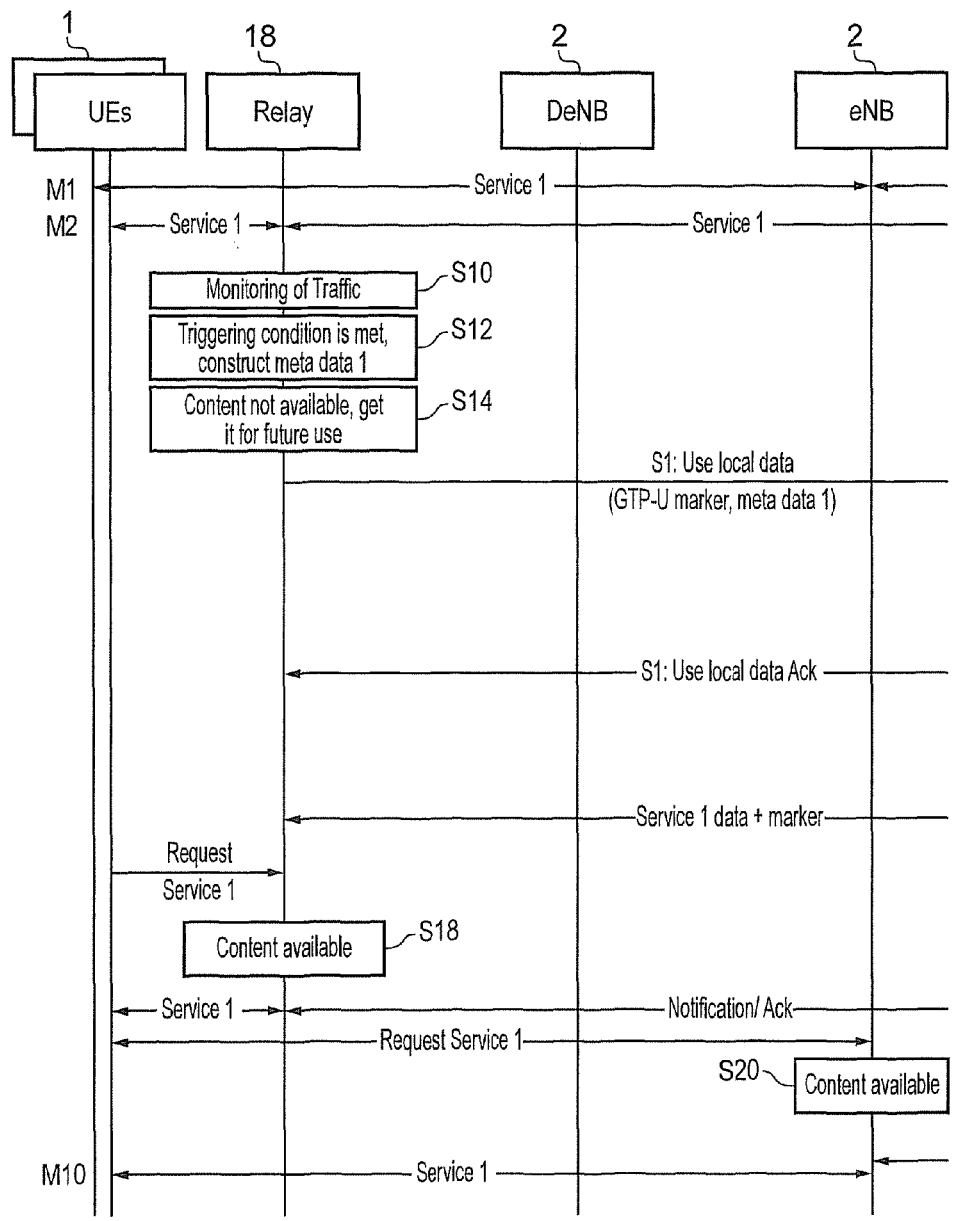
FIG. 8: Triggers at the local node, Content Upload and retrieval via the PDN-GW

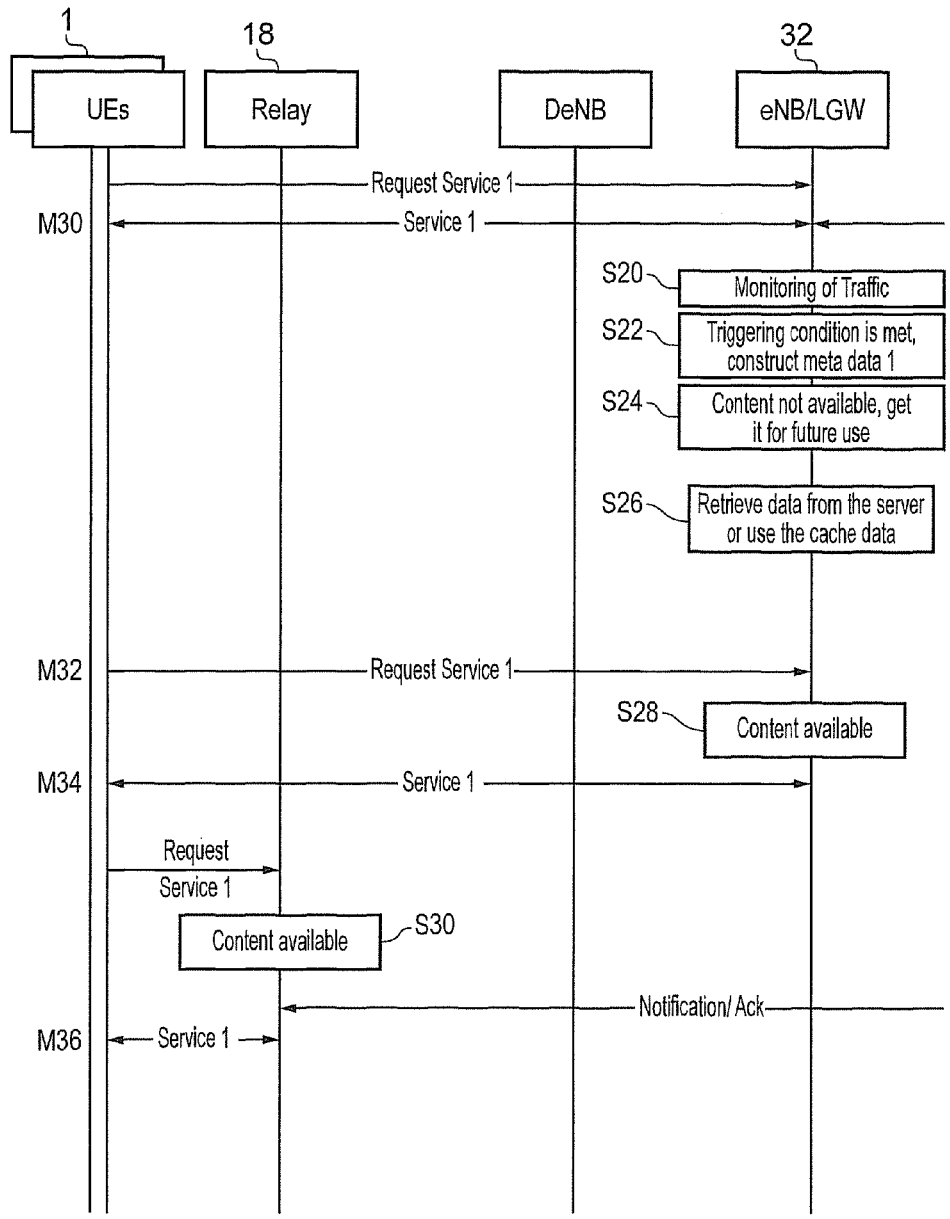
FIG. 9: Triggers at the local node, Content Upload and retrieval via local GW

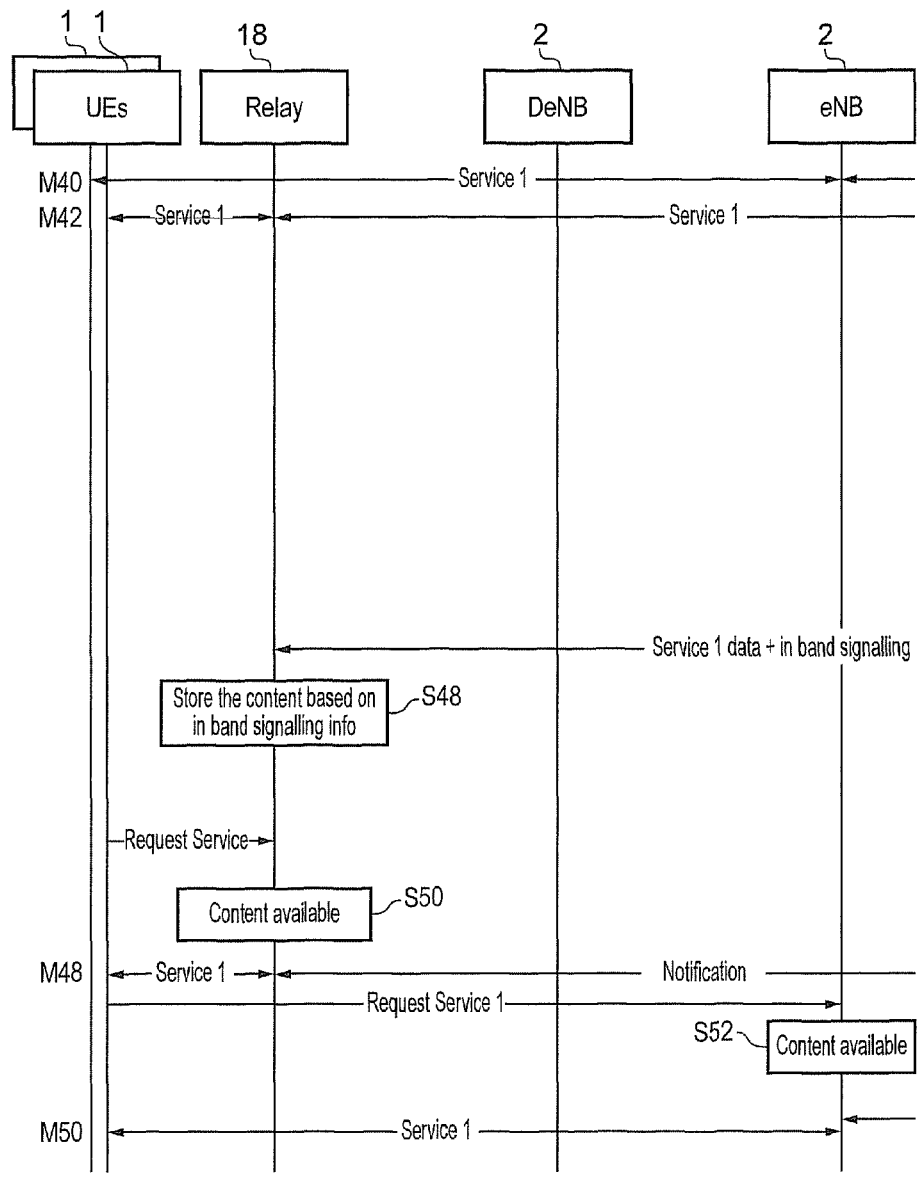
FIG. 10: Triggers at the application server, Content Upload and retrieval

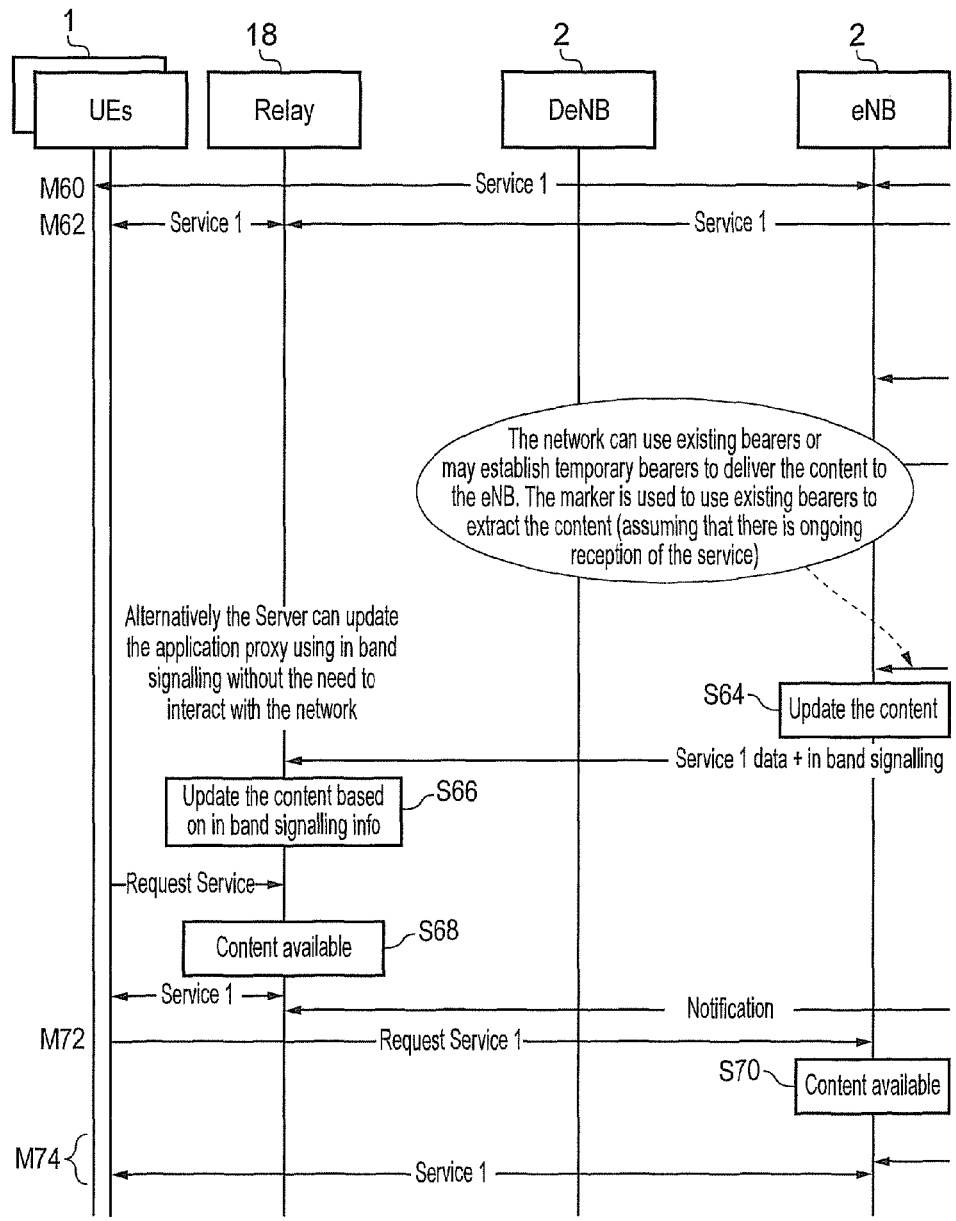
FIG. 13: Content modification (update/delete)

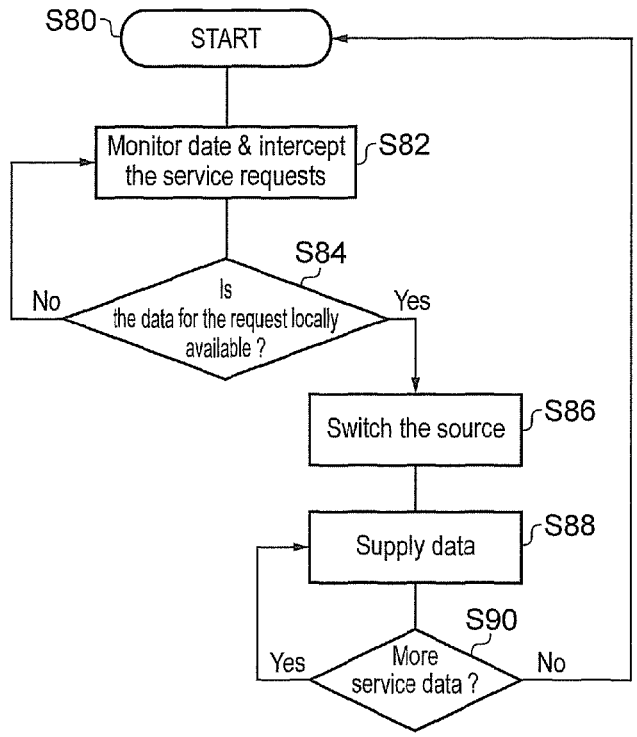
FIG. 14: Discrimination process at the local node
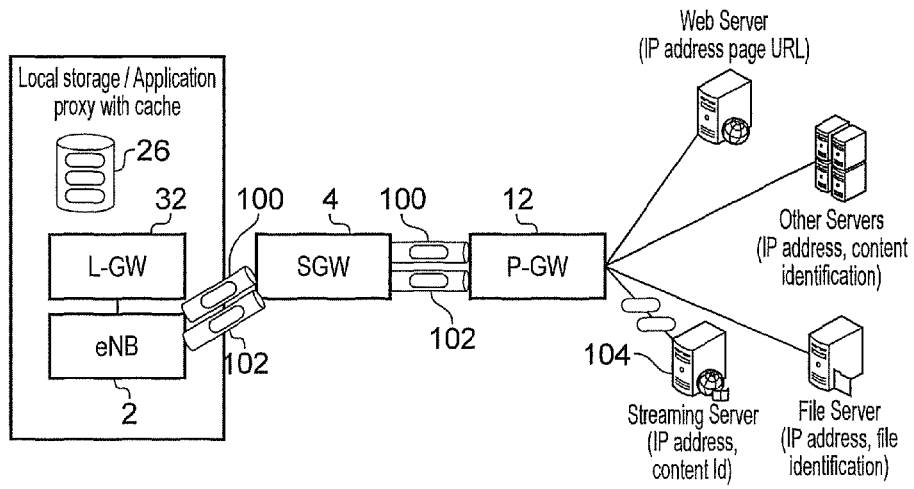
FIG. 15: PDN/Bearer Management

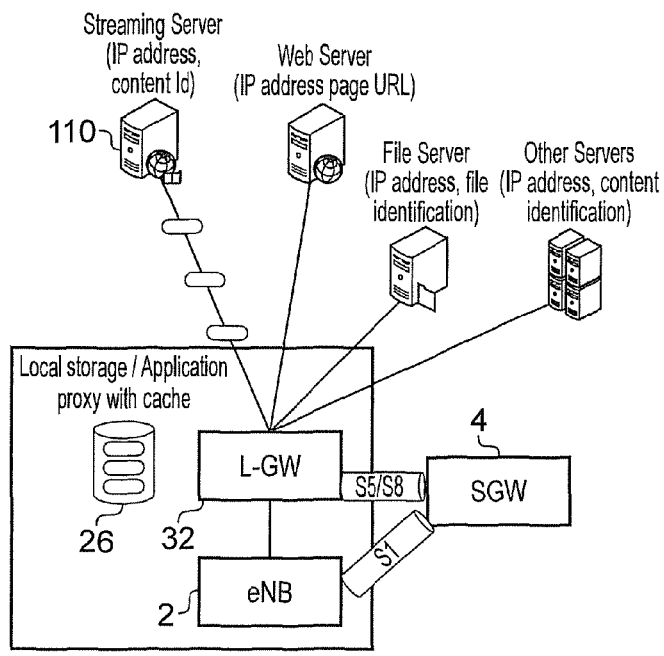
FIG. 16: PDN/Bearer Management
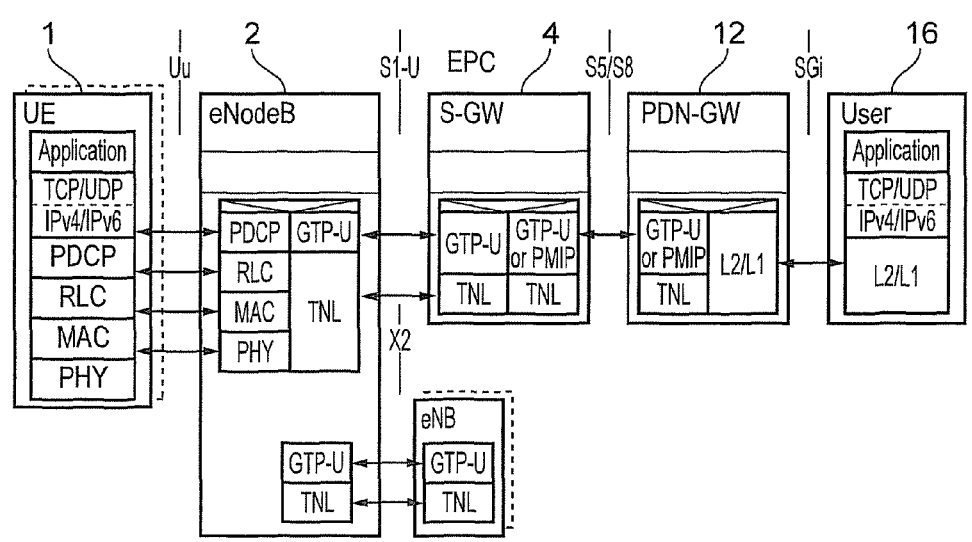
FIG. 21: LTE/EPC E2E protocol archtecture

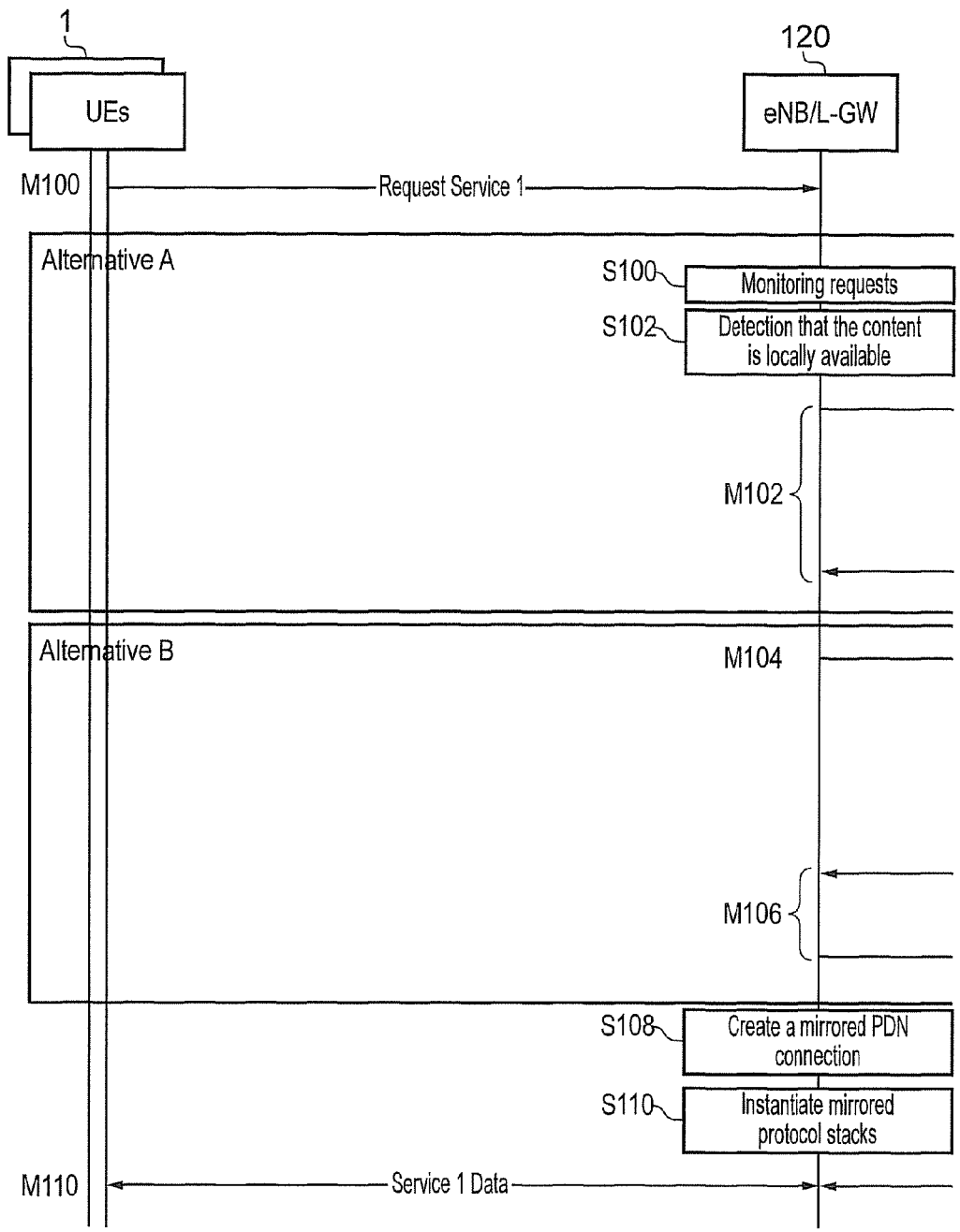
FIG. 17: Connection Switching

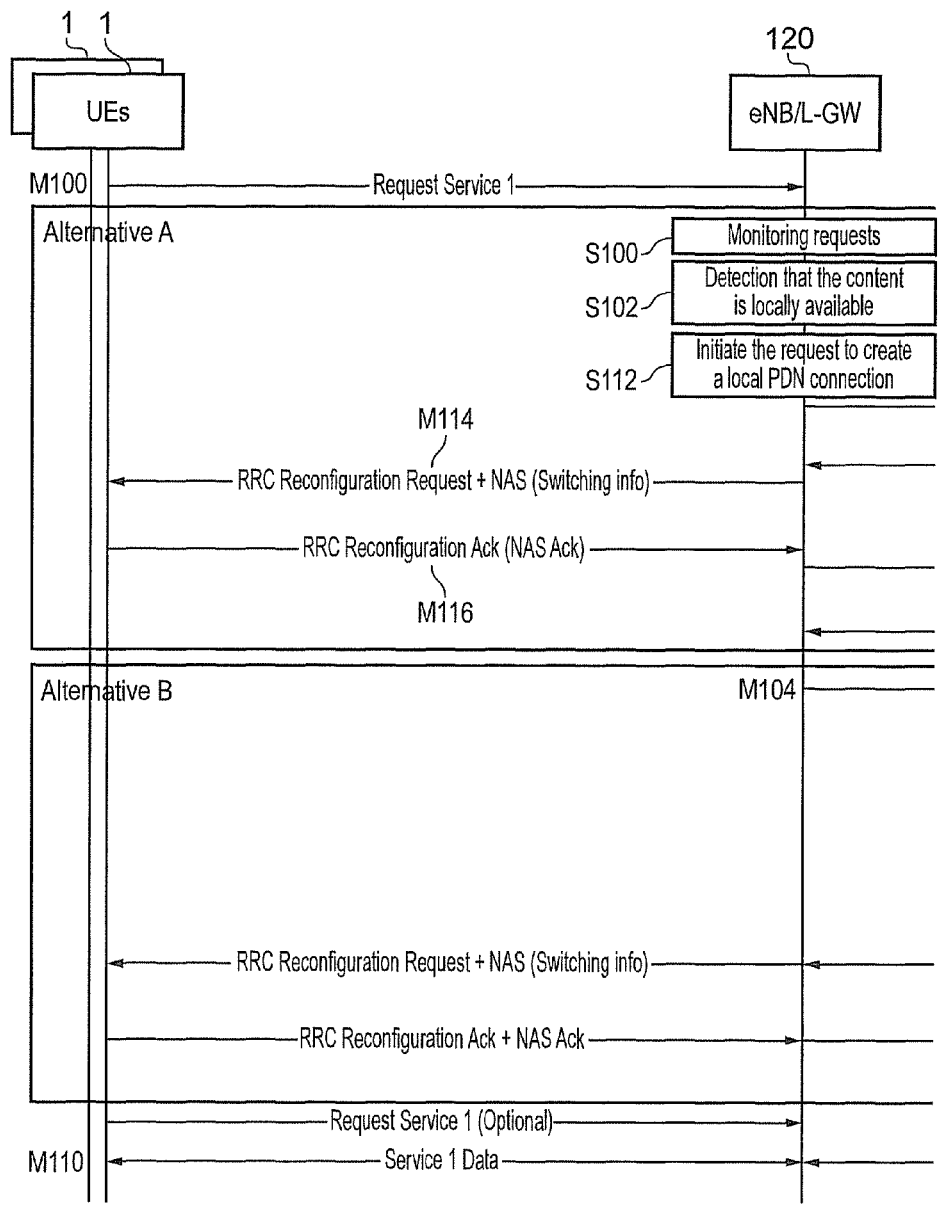
FIG. 18: Triggered new PDN/bearer establishment

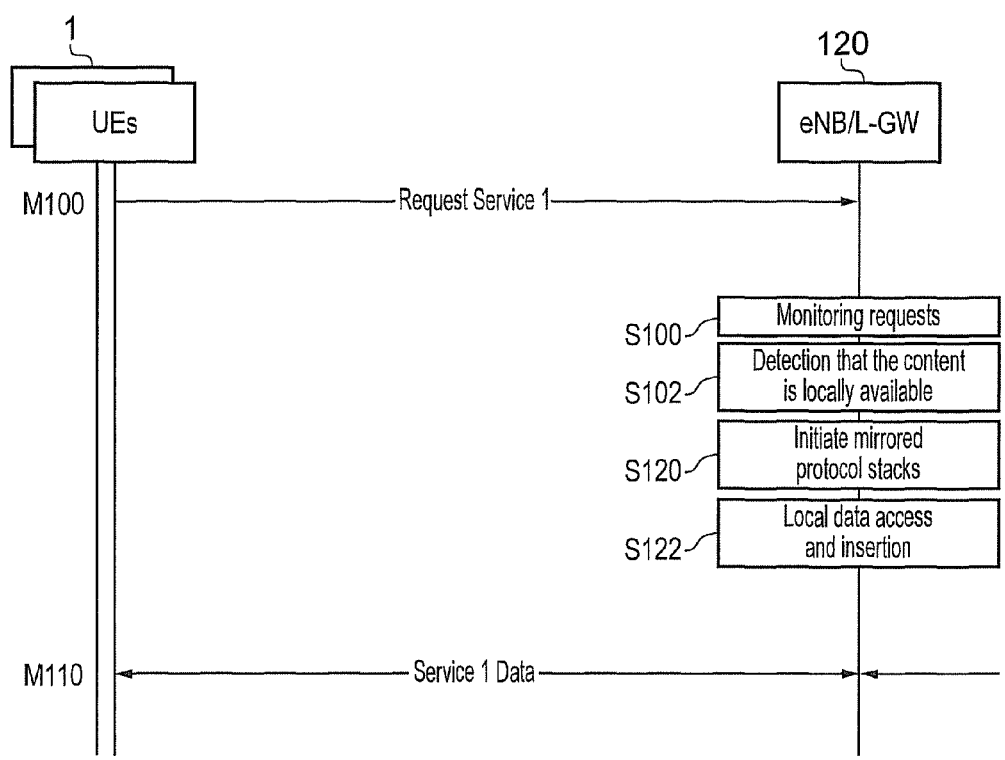
FIG. 19: U-Plane Data Insertion

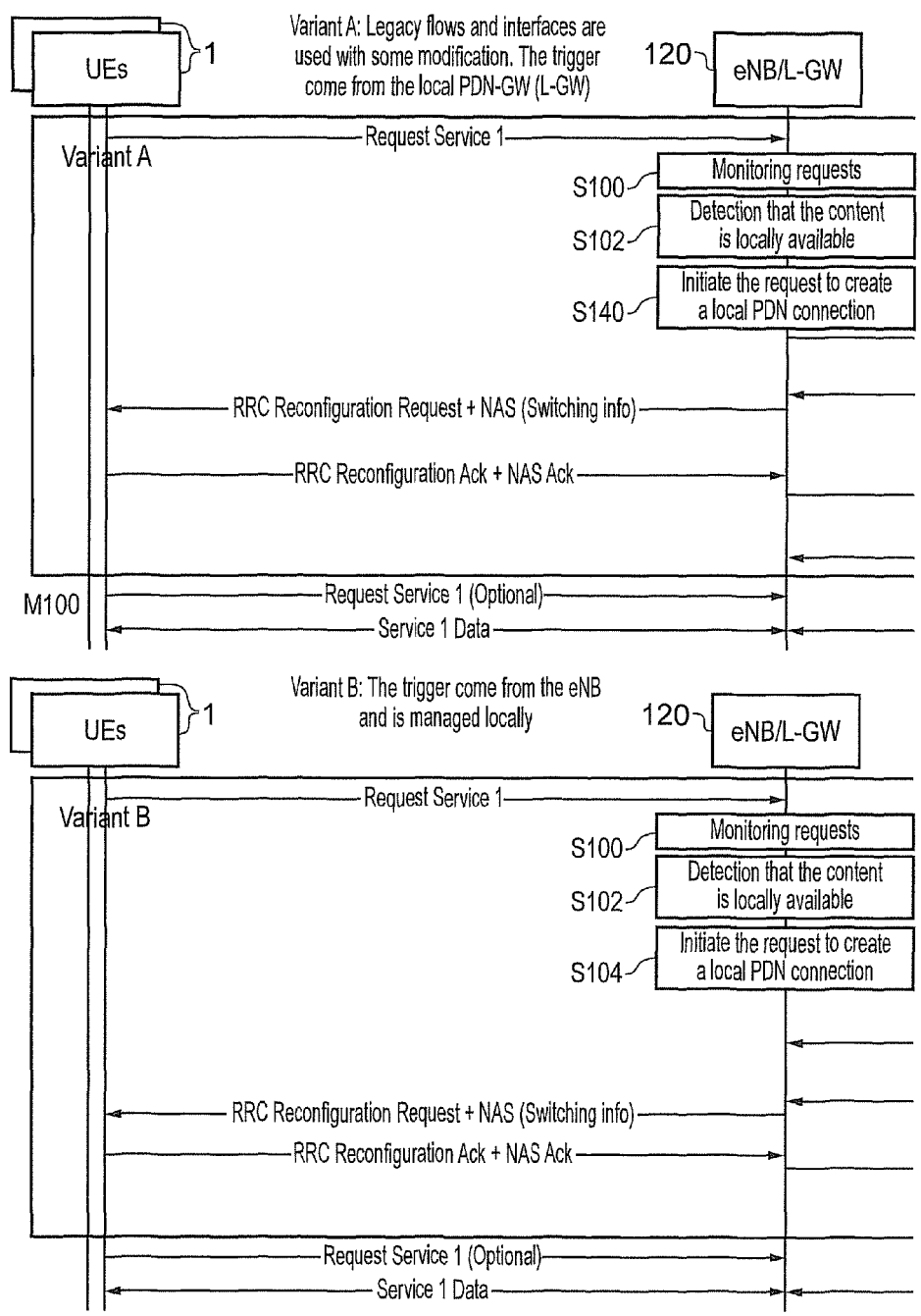
FIG. 20: Triggered new PDN/bearer establishment

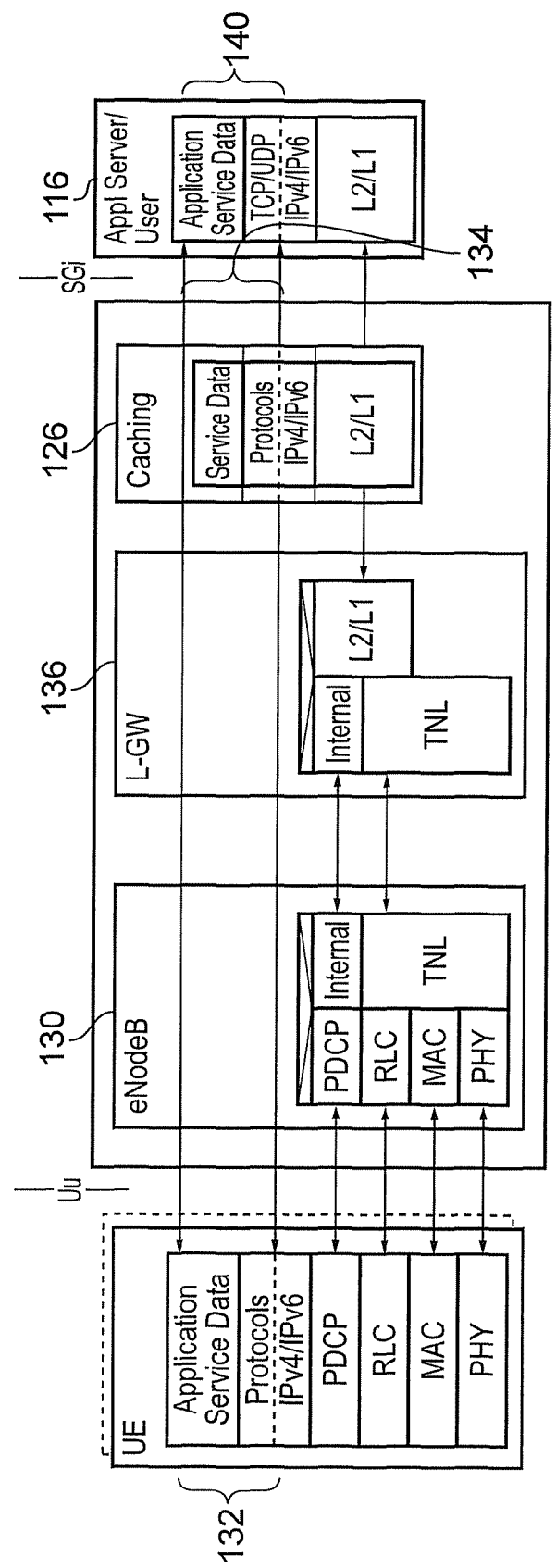
FIG. 22: Local storage/caching (LIPA scenario/triggers from the local node)

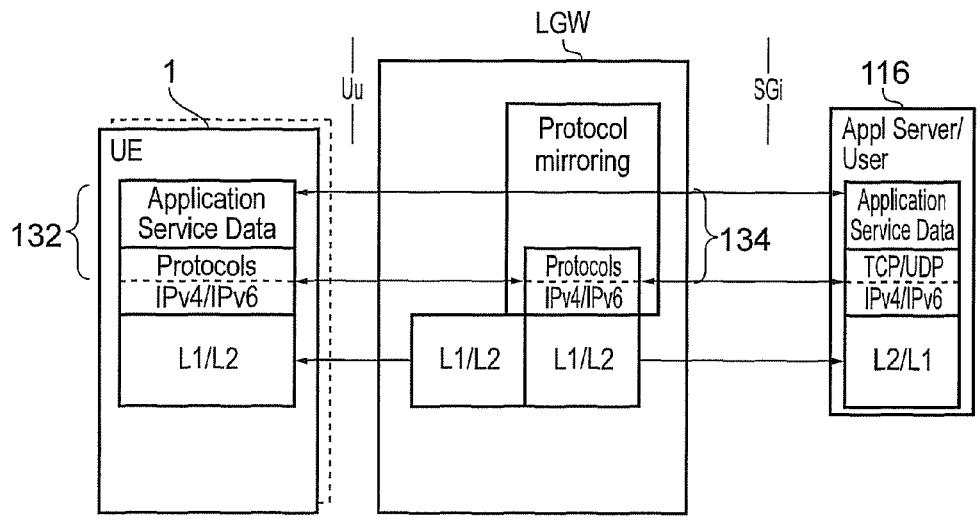
FIG. 23: Protocol mirroring
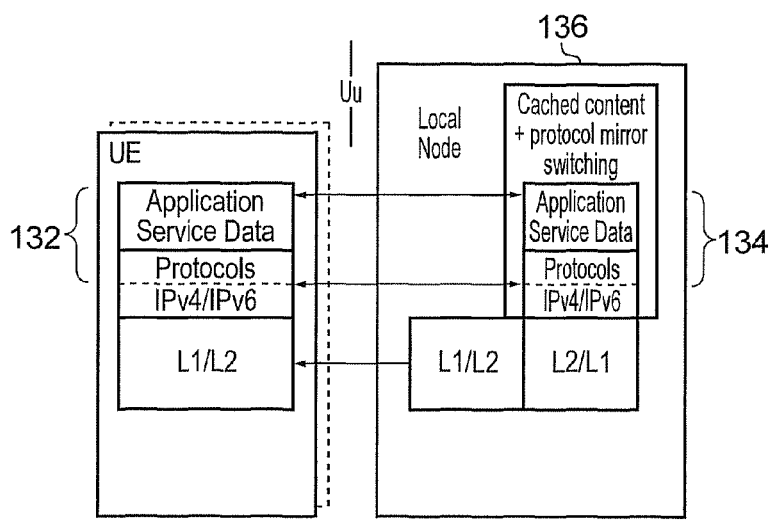
FIG. 24: Protocol mirror switching/local service data delivery General note: The difference between LIPA and SIPTO is that the L-PGW is a different physical entity than P-GW whereas for LIPA only the L-PGW is used (no P-GW in the core is used). Any bearer / dedicated/ default can be used Variant B for SIPTO:
-PDN Connection 1 has been created via the P-GW
-PDN Conenction 2 has been created via the L-GW/ENB

METHODS AND APPARATUSES FOR COMMUNICATING CONTENT DATA TO A COMMUNICATIONS TERMINAL FROM A LOCAL DATA STORE

CROSS-REFERENCE TO RELATED APPLICATIONS

The present application is based on PCT/GB2012/052238 filed 11 Sep. 2012, and claims priority to British Patent Application 1115746.8, filed in the UK IPO on Sep. 12, 2011 and British Patent Application 1115745.0, filed in the UK IPO on Sep. 12, 2011, the entire contents of each of which being incorporated herein by reference.

FIELD OF THE INVENTION

The present invention relates to communications terminals for receiving data packets from mobile communications networks and methods for receiving data packets.

BACKGROUND OF THE INVENTION

Mobile communication systems have evolved over the past ten years or so from the GSM System (Global System for Mobiles) to the 3G system and now include packet data communications as well as circuit switched communications. The third generation project partnership (3GPP) has developed a mobile communication system referred to as Long Term Evolution (LTE) in which a core network part has been developed to form a more simplified architecture based on a merging of components of earlier mobile radio network architectures and a wireless access interface which is based on Orthogonal Frequency Division Multiplexing (OFDM) on the downlink and Single Carrier Frequency Division Multiple Access (SC-FDMA) on the uplink.

Access to the internet for gaining information and services has become ubiquitous for modern day electronics devices. As such, evolved mobile communications networks such as the LTE standards are being developed in order to incorporate features which can facilitate connection to the internet and transmission of content data to mobile communications terminals wirelessly. The content data may be any type of data which is providing services to a user. For example the content data may be streams audio or video content or a web page, but these are just examples. The term content data should therefore not be limited to a particular type of data but is generally used to infer higher layer user data.

As will be appreciated by those acquainted with the field of mobile telecommunications, communications resources are a valued commodity and so should be managed as efficiently as possible.

It has been envisaged that many mobile communications terminals may be receiving content data such as streaming video audio and data from a packet data network such as the internet via a mobile communications network, which may in some examples be the same content data items from the same source and so managing the delivery of that content data represents a technical problem.

SUMMARY OF THE INVENTION

According to the present invention there is provided a communications terminal for receiving content data via data packets from a mobile communications network. The mobile communications network includes a core network part having a plurality of infrastructure equipment, and a radio network part including a plurality of base stations for providing a wireless access interface for communicating the data packets to the communications terminal. The core network part or the radio network part include a local data store having stored therein content data, which has been received from an applications server via the core network. The communications terminal is configured to communicate a request to the mobile communications network to access the content data from the applications server, and to receive the content data from the mobile communications network the content data from the local data store as if the content data had been communicated from the applications server.

According to an example embodiment of the present technique, content data which is being accessed by a communications terminal from an applications server using a mobile communications network is provided from a local data store within the mobile communications network, which has cached the content data for access by communications terminals which are attached to the mobile communications network. The communications terminal is therefore delivered the content data from the local data store as if the content data was communicated from the applications server.

It is envisaged that for more popular websites and applications the same data maybe streamed to more than one mobile communications terminal using a mobile communications network. Accordingly, if the same content data is being communicated via individual communications bearers for each of the communications terminals which are accessing that content data from the same applications server then this can represent an inefficient use communications resource of the network. Accordingly, it would be desirable to find an improvement in which the same content data is communicated to communications terminals which may access this content either contemporaneously or at different times.

Embodiments of the present invention can also provide an arrangement for efficiently switching between content data accessed from a remote application server and the content present in a local data store in a way which is either transparent to the communications terminal requesting the content or the switching of the content data present in the local data store is achieved with a reduced or minimised affect on the operation of the communications terminal in accessing the content and in some examples no effect on the mobile communications terminal. The local data store may be accessed from a "local gateway" providing the communications terminal with access to internet protocol communications for accessing the content data as if the content data was accessed from a remotely located PDN server. According to some examples the mobile communications terminal is provided access to the content data from the local data store as if the content data was delivered from the applications server using one or more of protocol mirror, bearer redirection or user plane data interception. In some examples access to the content data from the local data store is provided using a Local Internet protocol access technique or a Selected IP Traffic Offload (SIPTO) technique.

Further aspects and features of the present invention are defined in the appended claims and include a communications terminal, an infrastructure equipment for forming a local gateway or an edge node for communicating content data to the communications terminals and a method of communicating data.

BRIEF DESCRIPTION OF THE DRAWINGS

Example embodiments of the present invention will now be described with reference to the accompanying drawings in which like parts have the same designated references and in which:

FIG. 3 is a schematic block diagram of network elements of the mobile communications network shown in FIG. 1 illustrating a high level of architecture of the SIPTO technique;

FIG. 4 is a high level of architecture of network components forming a LIPA technique;

FIG. 14 is a flow diagram illustrating a process performed at a local node to determine whether content data can be accessed locally within a local data store or accessed via a remote application server;

FIG. 15 is a schematic block diagram illustrating parts of the mobile communications network shown in FIG. 1 in which access to the content data is managed using a Selected IP Traffic Offload (SIPTO) technique;

FIG. 16 is a schematic block diagram of parts of the mobile communications network shown in FIG. 1 in which access to the content data is managed using a Local IP Access (LIPA) technique:

FIG. 21 is a schematic block diagram illustrating a protocol architecture for accessing the content data in the legacy system;

FIG. 22 is a schematic block diagram illustrating network elements with a protocol stack arrangement providing an example of accessing content data locally using a LIPA technique;

FIG. 23 is a schematic block diagram of network elements illustrating a protocol mirroring arrangement using a LIPA technique;

FIG. 24 is a further example of parts of the communications network shown in FIG. 1 operating to provide access to content data via a local associated data store using protocol mirroring in accordance with a LIPA technique;

DESCRIPTION OF EXAMPLE EMBODIMENTS

Embodiments of the present invention will now be described with reference to an implementation which uses a mobile communications network operating in accordance with the 3GPP Long Term Evolution (LTE) standard. In the following description LTE/SAE terminology and names are used. However embodiments of the present technique can be applied to other mobile communications systems such as UMTS and GERAN with the GPRS core network.

Figure 1:
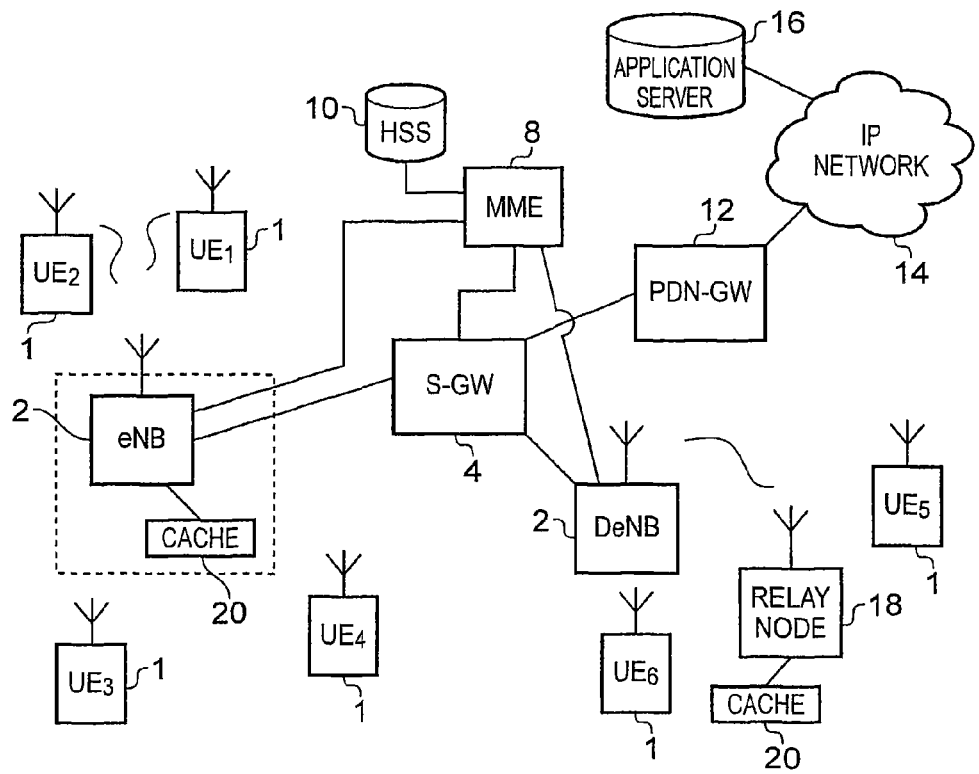
FIG. 1 is a schematic block diagram of a mobile communications network operating in accordance with the LTE standard for illustrating the present technique.

FIG. 1 provides an example architecture of an LTE network. As shown in FIG. 1 and as with a conventional mobile communications network, mobile communications terminals (communications terminal) 1 are arranged to communicate data to and from base stations 2 which are referred to in LTE as enhanced NodeBs (eNB). The base stations or eNodeB's 2 are connected to a serving gateway S-GW 4 which is arranged to perform routing of data packets and management of mobile communications services for communicating the data packets to the communications terminals 1 and the management of mobility by the MME as the communications terminals roam throughout the mobile communications network. To this is end an interface is provided between the MME and the eNB 2. In order to maintain mobility management and connectivity, a mobility management entity (MME) 8 manages the enhanced packet service (EPS) connections with the communications terminals 1 using subscriber information stored in a home subscriber server (HSS) 10. More information may be gathered for the LTE architecture from the book entitled "*LTE for UMTS OFDM and SC-FDMA based radio access*", Holma H. and Toskala A. page 25 ff.

Also connected to the serving gateway 4 is a packet data network gateway 12 which forms an interface between the mobile communications network and an internet protocol network 14. An application server 16 is connected to the internet protocol network. For the example shown in FIG. 1 a relay node 18 is also deployed. The relay node 18 is provided to extend a possible range of the mobile communications network beyond that of an eNB 2. Thus the eNB 2 acts an "donor" eNB which communicates data to be transmitted to the relay node 18 which then re-transmits that data onto mobile communications terminals 1 which are out of range of the eNB2, thus extending a range of the donor eNB.

Caching Content at Local Gateway (eNB/Relay)

Embodiments of the present technique can provide an arrangement for detecting that content data to be communicated to mobile communications terminals attached to a mobile communications network should be cached, and can provide an arrangement for efficiently accessing cached content data. In the following description the term cache or caching is used to describe a local data store or a processing of storing data in a local data store respectively. The associated data store may be referred to as a "cache" which is associated with a base station 2 or a relay node 18 which form effectively an "edge node" of the mobile communications network. An "edge node" is a term which is used to express a final communications element of a mobile communications network at which point data is communicated to a mobile communications terminal 1. Accordingly, in one example, the edge node determines whether content data provided as a communications service should be accessed locally in a local data store or cache or remotely from an application server from which it originated. In some examples an infrastructure owner can manage and configure its participation level in delivering content using the present technique and an operator/application data provider may supervise and police the delivering of content data. For example this may include:

1. Taking into account user preference and policies.
2. Enabling the system to manage the content (store/update/delete). This may also take into account policies to minimize cost for the operators, for example to manage the content at the time when the network resources are underutilized or avoiding network use at peak times.
3. Making decisions as to whether the particular service shall be cached/stored locally at the edge of the network or delivered from the remote servers.

In one example, the infrastructure owner could be an end user, for example a Home eNB or relay node may be deployed by the user in the user's home or third parties which can provide a form of investment and means to generate profits. From a user point of view it is desirable to make access to the content data from the local cache invisible in that the user is not able to tell whether its service data is provided by the local entity or from servers remotely located in the network. Thus embodiments of the present technique provide an arrangement in which content data which is communicated to mobile communications terminals is stored locally in an associated data store. The present technique therefore arranges for content data which is frequently accessed by mobile communications terminals 1 to be stored locally in the associated data store or cache 20 so that when other communications terminals 1 wish to access that same content data, the content is provided to the communications terminals 1 from the local cache 20 rather than communicating content data from the application server 16, thereby saving on communications resources of the mobile communications network.

Figure 2:
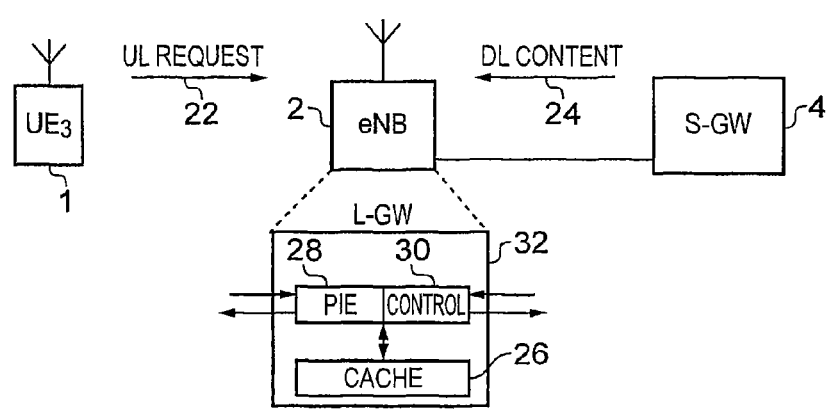
FIG. 2 is a schematic block diagram of a part of the network shown in FIG. 1 illustrating an operation of a packet inspection entity and cache controller.

An example illustration of a mobile communications network adapted to operate in accordance with the present technique is illustrated in FIG. 2. In FIG. 2 a communications terminal 1 transmits requests on the uplink to a base station (eNB) 2 requesting particular content item 22. Correspondingly, a packet data communication bearer transmits the content data item via a downlink communications stream 24 from a serving gateway 4 having retrieved that content data item from the application server 16 via the IP network 14 and the PGW 12. However, in accordance with the present technique the base station 2, which for the present example forms an edge node of the communications network.

In the following explanation the terms base station and eNB may be used interchangeably, because an eNB is one example of a base station.

The base station 2 includes a cache or associated data store 26 and one or both of a packet inspection entity 28 and a cache controller 30. Together, the packet inspection entity 28 and the cache controller 30 can form effectively a local gateway 32 for providing access to the content data which maybe cached within the associated data store 26. The packet inspection entity 28 analyses uplink requests 22 from mobile communications terminals 1 as well as communicated downlink content data such as the data stream 24 in order to determine whether or not the content data is being accessed frequently enough for it to be more efficient if that content were stored within the associated data store or cache 26. Predetermined triggering conditions are established for determining whether the content data item should be cached such as a number of communications terminals accessing the content data item, whether the edge nodes have a capability to cache content and whether the content owner is willing to allow copies of the content data items to be stored locally within the mobile communications network. Therefore the packet inspection entity 28 provides a high level functional element which identifies and determines whether content data should be cached in the local data store.

If the packet inspection entity 28 is within the local gateway 32 then the content data can be intercepted by the local gateway and stored within the cache 26. In one example, if the content data has been cached by the local gateway 32 then the local gateway communicates signalling messages to the PDN gateway 12 identifying that the content data has been cached so that any of the communications terminals 1 accessing that content data from the local data store or cache 26 can be appropriately controlled, authenticated and charged for access. In another example, if the cache controller 30 is within the local gateway 32 then the control of the access to the content data within the local data store 26 is made at the local gateway 32. The function of the packet inspection entity 28 is to identify that content data should be stored within the local data store 26 of each respective edge node which has a capability of caching the content data and/or for which it is worth caching the content data for example because of the number of mobile terminals accessing that content. The function of the cache controller 30 is to control access to that content data from the local data store 26 by switching the access from the remote application server to the local data store of the edge node. However, it will be appreciated that the packet inspection entity 28 and the cache controller 30 could be disposed separately in other parts of the mobile communications network or co-located. The location of the packet inspection entity 28 and the cache controller 30 may effect the functional performed respectively by each of these components as will be explained shortly.

Techniques for Accessing Content Based on SIPTO and LIPA

Typically, an enhanced packet communications (EPC) network is not aware of layer at which services are provided to users. An example in which an EPC network is provide with an indication of a service type is when the quality of service (QoS) parameters are allocated for a bearer which is used to handle service data. However embodiments of the present technique provide a more practical and efficient arrangement for firstly identifying content data which should be cached, then caching that content data in an edge node and then providing access to that content data to other communications terminals. This is achieved even though there is a technical problem that conventionally an EPC network is not aware of the type and nature of data being communicated except for the more complicated higher layer examples.

Having stored the content data within the associated data store 26, embodiments of the present technique can provide access to the content data from the associated data store or cache 26 to the communications terminals 1 as if the communications terminals were accessing that content data from the application server 16 remotely. There are two techniques proposed for accessing content data at the non access stratum signalling level, as if the communications terminals were accessing the content data via the internet protocol, which have been defined by the 3GPP to control the use of local gateways to provide internet protocol based services. These are known as Selected IP Traffic Offload (SIPTO) and Local Internet Protocol Access (LIPA). These concepts are similar in that the control or C-plane entity is located in the core network part, whereas the user or U-plane components are at the edge node of the mobile communications network.

Using the SIPTO and LIPA techniques to access the content data which has been stored locally in a data store associated with an edge node can provide two different management models which are network assisted and network active management models. The network assisted model can be thought of when the network triggers the application server and the application proxy residing in the local node. The process is visible to the application server/proxy. The network active management model can be thought of as when the network pushes the content onto the local node. This is invisible to the application server. The application server may assist the network providing information when the content has changed.

Each of the network assisted and network active management models may be selected depending on whether the operator has control over the application servers which provide the content data items and whether the application server has enough capability to process and use the information provided by the network.

A high level architecture example of network elements supporting SIPTO are shown in FIG. 3, whereas an example of network elements supporting LIPA are shown in FIG. 4. As will be explained shortly adaptation of the SIPTO and the LIPA for providing access to content data stored locally will be provided later.

In FIG. 3 a mobile communications terminal 1 would conventionally receive content data from a data path 50 via an eNB 2, a serving gateway 4 and an PDN gateway 12 as represented in FIG. 1. However, using the SIPTO technique access by the communications terminal to the content data is achieved by diverting an access point name or IP address to a local PDN gateway 52 so that the communications terminal 1 receives the content data via a data path 54. In contrast, a high level architecture for the LIPA technique shown in FIG. 4 provides an arrangement in which a communications terminal accesses the content using an LIPA technique from a local cache using a home eNB or local gateway 32. Thus, the local gateway 32 forms a home eNB which is attached to a home network 56 via a home router 58 which connects to an IP backhaul network 60. The serving gateway 62 is not used for the user-plane data transmission in LIPA. The serving gateway 62 is only used to trigger the paging via the reception of the dummy empty user-plane packet from the local gateway (i.e. the Local P-GW). A data path for LIPA is via an IP backhaul between the Local P-GW (L-GW) and the eNB. The interface between the eNB and the local gateway is the internal interface. Mobility is not supported for LIPA and this practically also applies for SIPTO. Further explanation of the techniques for switching mobile communications terminals from remote access via the application server 16 to the local cache within for example a local gateway 32 will be explained shortly.

Location of Packet Inspection Entity (PIE) and Cache Controller

Embodiments of the present technique define predetermined conditions or triggers for content management. The triggers indicate the conditions under which content data items needs to be manipulated (uploaded/updated/removed) by the network. The triggers may come from different sources. The decision as to which entity generates the triggers depends on the location of an entity which is performing traffic monitoring, detection and discrimination as will be illustrated by the following illustrative examples in which this entity is referred to as a packet inspection entity. From a network point of view it does not matter whether the content is cached at a relay node or at the eNB and hence as explained above may be referred to as generic examples of edge nodes. The following examples provide an illustrative arrangement in which a mobile communications network determines that a content data item is to be cached in a local data store and then allows access to that content data by other mobile communications terminals. A technical problem which is addressed by embodiments of the present technique is to determine that content data is to be cached when the content data is to be communicated via an EPC data communications network. This is because the EPC network is not aware of the service layer which identifies the content data and its source. Accordingly, the present technique provides a packet inspection entity, which, as explained above, is used to inspect both requests for content data items which are communicated by communications terminals 1 and the content data items being communicated to communications terminals 1 as illustrated in FIG. 2. However, the packet inspection entity 28 could reside in any network component as illustrated in FIGS. 5A-5E.

Figure 5A:
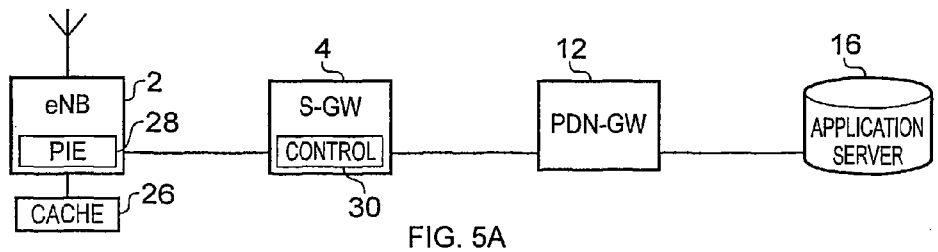
FIGS. 5A to 5E provide a schematic representation of parts of the mobile communications network shown in FIG. 1 in which a packet inspection entity is located in each of the different parts shown in FIGS. 5A to 5 E.

In FIG. 5A the packet inspection entity 28 is located within a base station 2 which has access to the cache data store 26. The packet inspection entity 28 is responsible for identifying content data items which should be cached. If the packet inspection entity 28 is located within the base station 2, the packet inspection entity 28 will have knowledge of the capability of the base station 2 as to whether or not it is able to cache content data. In this example the base station 2 forms the edge node for the communications terminals 1.

The cache controller 30 as explained in FIG. 2 provides access to the content data by communications terminals 1. Although the cache controller 30 could be located anywhere within the mobile communications network, locating the cache controller 30 within the base station 2 or the serving gateway 4 provide an advantage in that locating the cache controller close to the edge node provides the cache controller with more knowledge of both the capability of the edge node to cache content data items and the communications terminals which are accessing the content data. However in order to ensure correct authentication, authorisation and charging (i.e. the AAA functions) for access to the content, the cache controller would then have to communicate to the PDN gateway an indication of which of the communications terminals are receiving each of the different content data items.

Figure 5B:
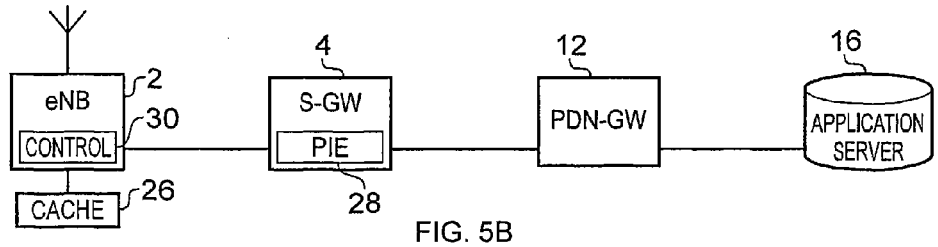
Figure 5C:
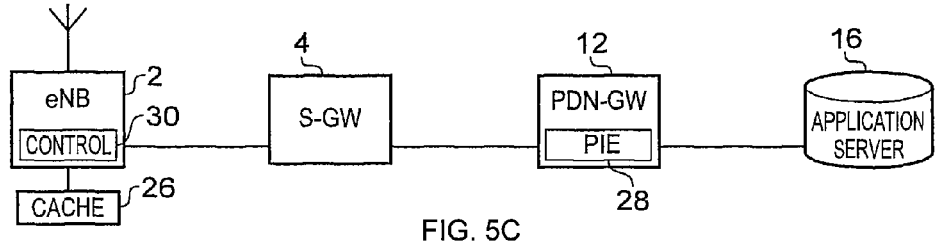
Figure 5D:
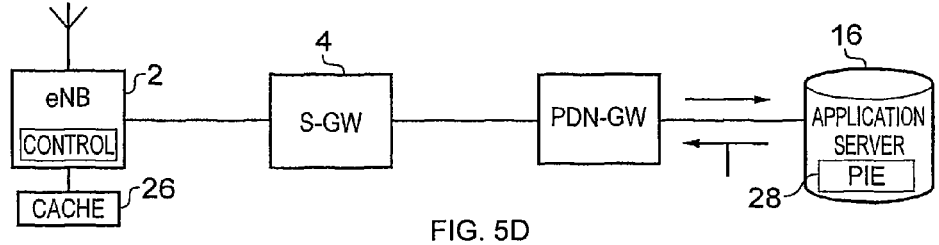

As illustrated in FIG. 5B the packet inspection entity 28 may be divided into two parts, a master part located in the serving gateway 4, and a slave part that assists the master part in providing information to store the content data in accordance with the triggering conditions. Since the serving gateway 4 is connected to a plurality of base stations or eNBs 2 within a geographical area, the serving gateway 4 will have knowledge of which of these plurality of base stations 2 will have a capability of storing content data within a local data store 26 and therefore can control the caching of content data once a decision has been made by the packet inspection entity 28 to cache that content data from a particular source. Therefore using this knowledge the slave part of the packet inspection entity 28 arranges the content data to be stored at locations which will bring the most benefit. This the primary decision is made by the master part and the slave part makes intelligent decisions on how to distribute this request or passes this information to the packet data network gateway 12. If as shown in FIG. 5C the packet inspection entity 28 is located within the packet data gateway (PDN) 12, then whilst the PDN gateway has access to each of the terminating end points of an IP layer communication which correspond to communications terminals accessing content data, the PDN gateway 12 may not have knowledge of a capability of the edge nodes or base stations 2 to cache the content data. Accordingly, having determined that content data from a particular source should be cached, the PDN gateway 12 may communicate with a cache controller 30 within the base station to control the caching of the content data within the local data store 26. In this scenario the S-GW needs to assist (unless the local PGN-GW (i.e. L-GW) is co-located with the eNB) from the reasons mentioned above. However, if the cache controller is located in the PDN gateway then authorisation, policing and charging is made easier, because according to a conventional arrangement of an LTE network, the PDN gateway is arranged to perform these functions.

In the following description the term local gateway is used to infer and imply a local function of a PDN-gateway PDN-GW, which is co-located at the eNB for LIPA but not for SIPTO.

A further example is where the packet inspection entity 28 resides within or in association with the application server 16. As will be explained shortly if the application server 16 receives an indication of a possible range of addresses which are allocated by the mobile communications network to communications terminals 1 accessing internet protocol services, then the application server 16 can identify which content data is being sent to communications terminals 1 and therefore the packet inspection entity 28 can determine which content data should be cached. Having identified communications terminals 1 in respect of destination IP addresses for content data which should be cached, the packet inspection entity 28 within the application server 16 communicates control signalling to the PDN gateway 12 which is passed via the serving gateway 4 to the base station (edge node) 2 to cache the content data where the base station 2 has a capability of caching content data.

Figure 5E:
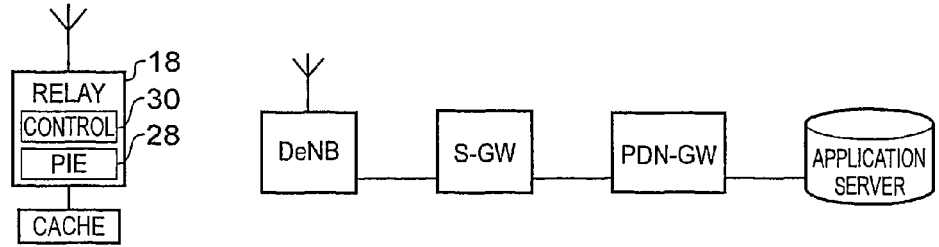

A similar example corresponding to that shown in FIG. 5A is provided in FIG. 5E in which a relay node 18 forms the edge node of the communications network for the communications terminals 1. The relay node 18 includes a packet inspection entity 28 which determines whether or not content data should be cached in the same way as that performed by the eNB 2 shown in FIG. 5A.

Thus, in accordance with the examples illustrated above with reference to FIGS. 5A to 5E, it will be appreciated that any network element could include a packet inspection entity 28. However, as will be appreciated if a packet inspection entity 28 is not located within the edge node, which maybe the base station 2 or the relay node 18, then the packet inspection entity may not have knowledge of whether or not the edge node can store content data locally in a data store 26. On the other hand, in order to control access to content data to facilitate authentication, authorisation and charging for access to the content data and for associated telecommunications services, if the packet inspection entity 28 takes a decision to cache a particular content data item then a cache controller 30 will need to communicate an indication that that item of content data has been cached to the PDN gateway 12. Furthermore the cache controller 3 may need to communicate an indication that particular communications terminals 1 have accessed the content data items. Further example operations of different locations for the packet inspection and controlling the caching of data are provided in the call flow diagrams provided in FIGS. 7 to 10, which are described in the following paragraphs.

Triggers at the PDN-GW, Content Upload and Retrieval

Figure 6:
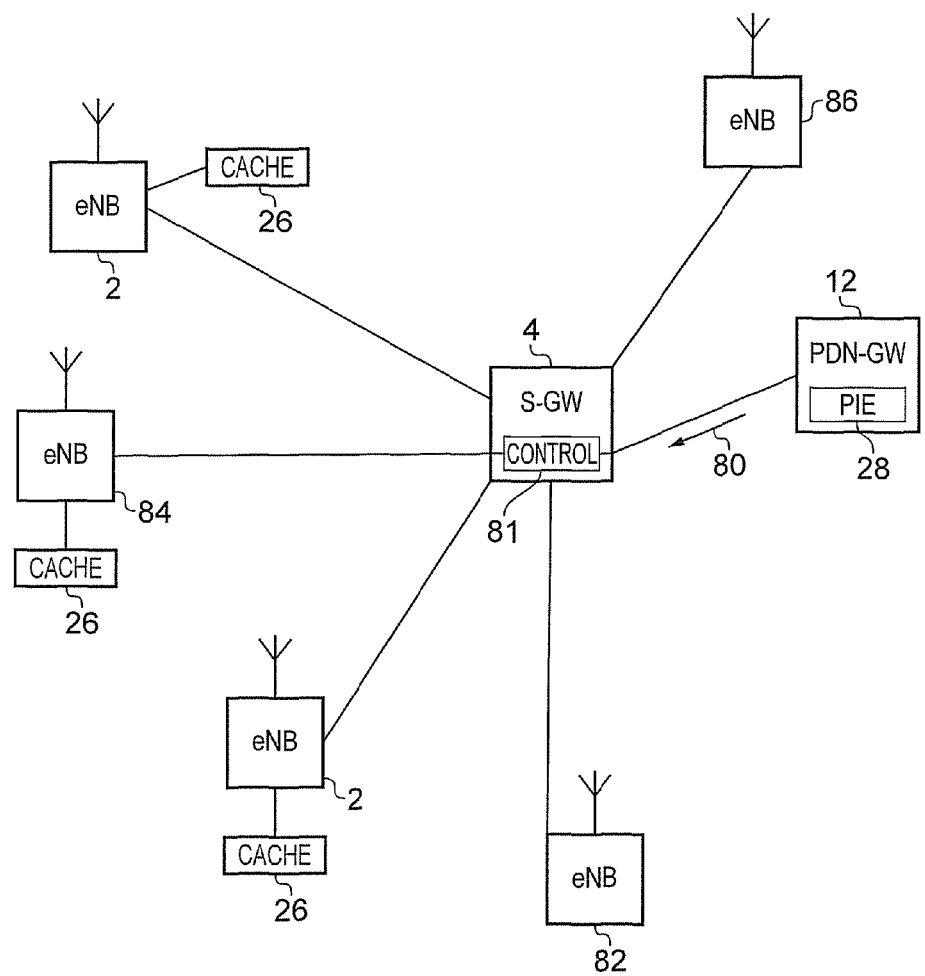
FIG. 6 is a schematic block diagram of parts of the network shown in FIG. 1 illustrating a location of a packet inspection entity and a cache controller according to one example.

FIG. 6 shows an example in which the packet inspection entity 28 is located within the PDN gateway 12. As explained above the PDN gateway 28 has no knowledge of which of the eNBs 2 or relay nodes 18 have a caching facility or which communications terminals 1 are attached to which of the eNBs 2. However this knowledge is available to the serving gateway 4. Therefore for the example shown in FIG. 6, the serving gateway 4 includes the cache controller 30 to control the caching of the content data within eNB 2 which have an associated data store 26. Therefore having determined that content data from a particular source should be cached for access by communications terminals 1, the PDN gateway 12 communicates a control message 80 to the serving gateway 4 that the content data for the set of mobile communications terminals should be cached. The serving gateway 4 then determines a number of communication terminals which are attached to each of the eNBs 2 to identify local "hot spots". A hot spot is identified from a certain number of communications terminals which are attached to one of the base stations 2 exceeding a certain threshold number. Alternatively the hot spot indicator could be set in accordance with a number of the communications terminals which are accessing the same cached content data items exceeding a predetermined threshold. If either of these threshold values are triggered then the serving gateway 4 directs the eNB 2 to cache the content data in the local data store 26 if that eNB has access to a local data store 26. Thus, in FIG. 6 eNB 82 does not have access to a local data store and so cannot cache content data items whereas another of the eNBs 84 may not have sufficient number of communications terminals attached to it or a sufficient number of communications terminals accessing content data for it to be worth storing the content data within the cache 26. Similarly, another eNB 86 may have a sufficient number of mobile terminals 1 attached to it but has no caching facility. Thus the serving gateway 4 can control the caching of the content data items depending upon the ability of the edge node to cache the content locally and the number of communications terminals accessing the content data or attached to that edge node. These are examples of predetermined conditions for caching the content data.

The communications terminals which wish to access the cached content data can be identified by either IP destination addresses of communications bearers which have been established by the communications network for communicating the content data or some other mobile identifier such as an IMSI or GUTI.

An edge node is therefore instructed by the network to cache the content. In one example, this could be realized by the PDN gateway based on internal information provided from the remote node. For example the PDN gateway can be accessed by the PCC, the PCEF resides at the PDN gateway in the existing PCC framework. The PCC has access to the SIP signalling content. The PDN gateway can also use statistical processing/profiling and DPI techniques to check whether similar content data items are requested on bearers terminated at a particular serving gateway. In terms of the supporting signalling the PDN gateway notifies the edge nodes via the MME over the GTP/PMIP (S5 or S8 interface) and S1 interface. This is applicable to both LTE-A relays, and eNBs, HeNBs acting as edge nodes because these entities terminate the S1 interface. This example is illustrated in more detail by the example shown in FIG. 7.

Figure 7:
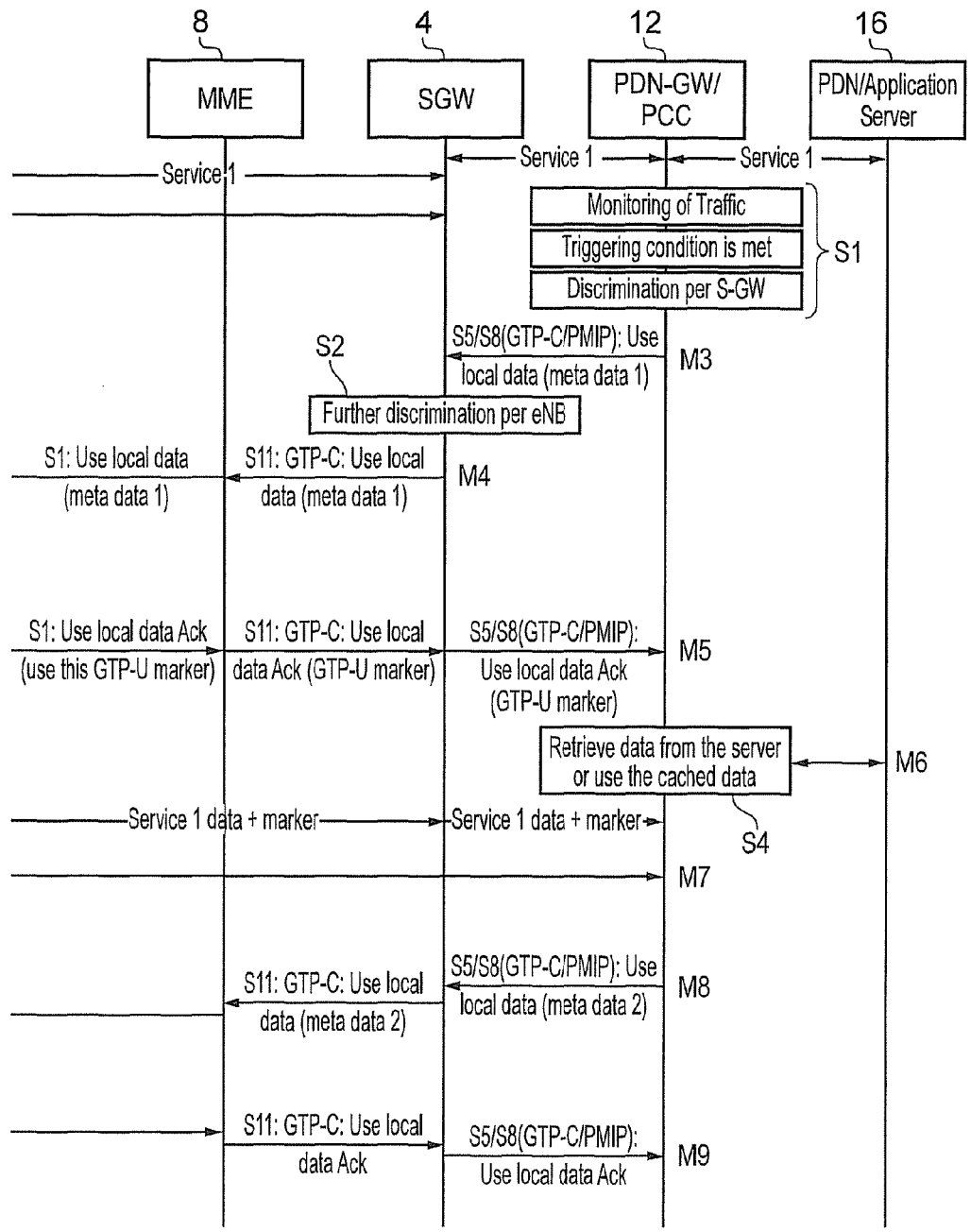
FIG. 7 is a call flow diagram illustrating an example in which content data is uploaded and retrieved at a relay node triggered by a packet inspection entity located in a packet data network gateway.

In FIG. 7 a call flow diagram is shown in which communications terminals 1 access content data from an application server 16 via a PDN gateway 12, a serving gateway 4 which uses an MME 8 via eNB 2 or a donor eNB 18 and a relay node 18. In a message flow M1 a conventional message exchange is made which allows communication terminals 1 to access content data on the application server 16. A message flow M2 provides a corresponding example in which the content data is delivered to communications terminals 1 via the relay node 18. For the example shown in FIG. 7 the monitoring of the traffic is performed within the PDN gateway 12 as a process step S1. Therefore, the PDN gateway 12 may include a packet inspection entity 28 which determines which content data items are to be cached. If a triggering condition is met (S1) such as if a certain number of accesses are made to the same content data items then the PDN gateway 12 determines that the content data items should be cached. Accordingly, PDN gateway 12 communicates a message M3 to the serving gateway 4 that content data should be cached for a particular set of addresses which identify the communications terminals 1, or for a particular S-GW which has a large number of bearers used to access the same content. The serving gateway 4 then performs some further discrimination in process step S2, as to whether the content data can be cached by a particular base station or eNB 2 and if it can a message flow M4 is provided to inform other nodes that the content data should be cached. If the content data is not available as determined at process step S3 for a particular base station 2 then via message exchanges M5, M6 the content data is downloaded at a step S4 to the base station 2.

The content is not downloaded, to the edge node, rather in some examples the edge node is instructed to store the content, and markers are configured at this stage if the content should be retrieved from the transmission to the mobile communications terminal which is about to commence or via the scheduled means and then a dedicated temporary bearer to the edge node is used. There are two ways to upload the content:

1. Retrieving from the ongoing transmission to the mobile communications terminal when marking is used; and
2. Schedule transmission and use temporary bearers established solely for the purpose of content uploading.

If a communications terminal 1 accesses the content data for the first time via a message M7 then via a message exchange M8 the content data is made available on the local data store 26. The relay node 18 indicates via a message exchange M9, that content data can be accessed by the communications terminal 1 on the relay node and through a message exchange M10 the content data is provided to the communications terminal 1 from the local data store 26.

In an alternative embodiment, information pertaining to a capability of the edge nodes 2, 18 to cache content can be accessed by the PDN gateway via the serving gateway 4 which will typically store some information related to the capabilities of the eNBs and relay nodes to store the data. A marker may be used to allow the edge node to extract the content data sent for other users and place it in the local storage for future use.

Triggers at the Edge Node

According to this example the edge node discovers the requested content data type by for example intercepting signalling messages such as a SIP signalling message or by detecting for example a URL address in a web browsing request to determine whether the content data should be delivered from a local data stored. In this example, the edge node knows the content data item which has been stored/cached so it may make a decision to use this when appropriate. This determination could also be made based on port numbers, IP addresses, FQDN etc. If the local IP access is possible at the edge node, the content can be fetched by the edge node when the triggering condition is met. However if the local IP access is not available, then the content data item must be delivered by the network. These two alternative examples of edge node triggering are provided in FIGS. 8 and 9.

Figure 8:
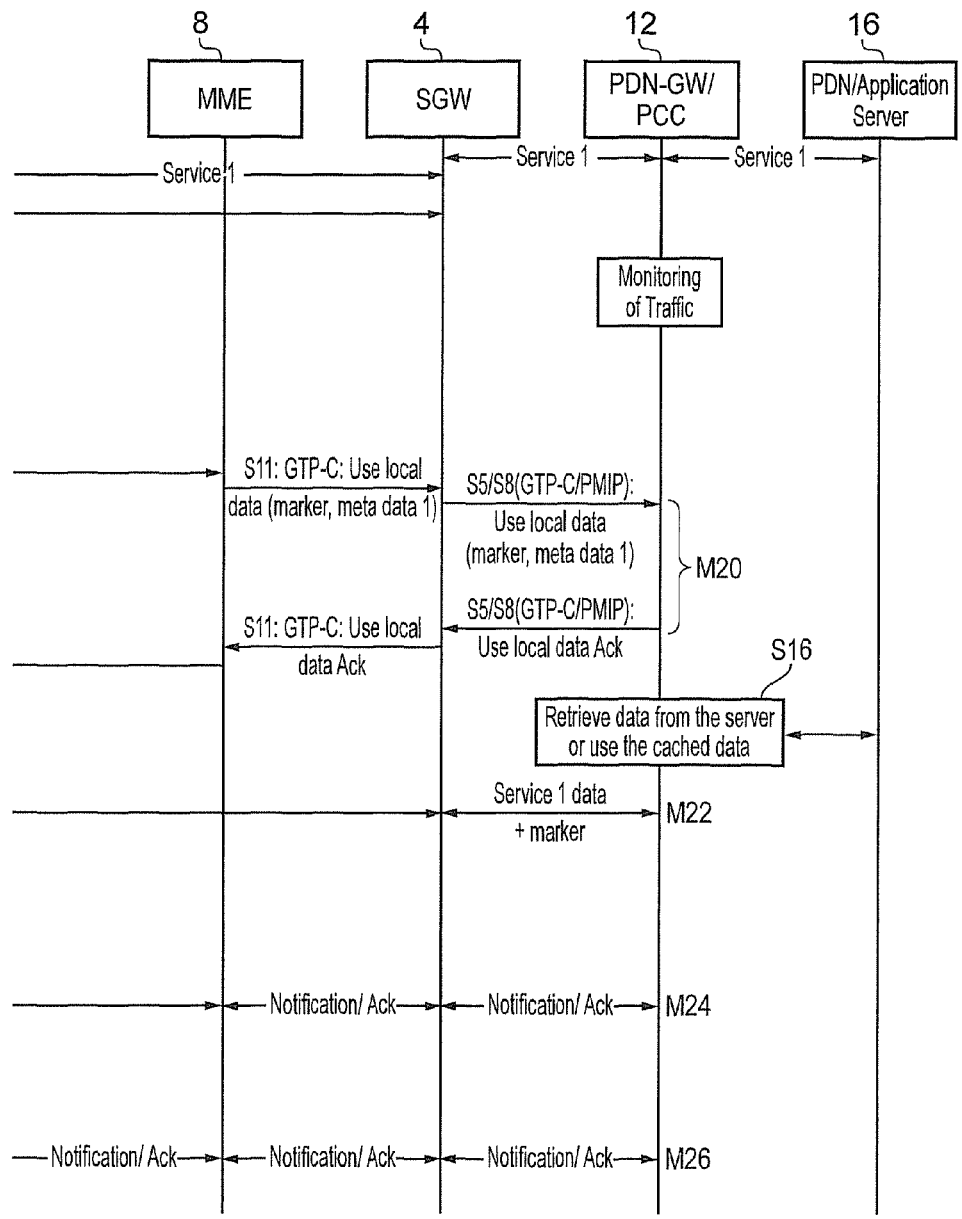
FIG. 8 is a call flow diagram illustrating an example in which a relay node includes a packet inspection entity and a cache controller and in which content is uploaded and retrieved from a packet data network gateway.

FIG. 8 provides an example call flow diagram for the case in which an edge node which is the relay node 18 determines that content data should be cached. FIG. 8 corresponds to the flow diagram shown in FIG. 7 and so only differences will be explained. In contrast the example shown in FIG. 7 the monitoring of a packet traffic and the determination that the triggering conditions for caching content for a particular source have been met S10, S12 are performed with the relay node 18 which may therefore include a packet inspection entity 28. At step S14 it is determined that the content data is not currently available within the local data store of relay node 18 and so with message exchange M20 the content data is accessed via the PDN gateway 12 so that in step S16 the content data is retrieved from the application server 16. Using a message exchange M22 the content data is made available in the associated data store 26 in step S18 to the relay node and provided to the mobile communications terminal in message exchange M24. In another example the content data is down loaded from the eNode B to the mobile communications terminal in step S20, because it already exists at the eNode B using message exchanges. A message exchange M25 is provided from the mobile communications terminal, which receives the content data from the eNode B in message exchange M26.

Figure 9:
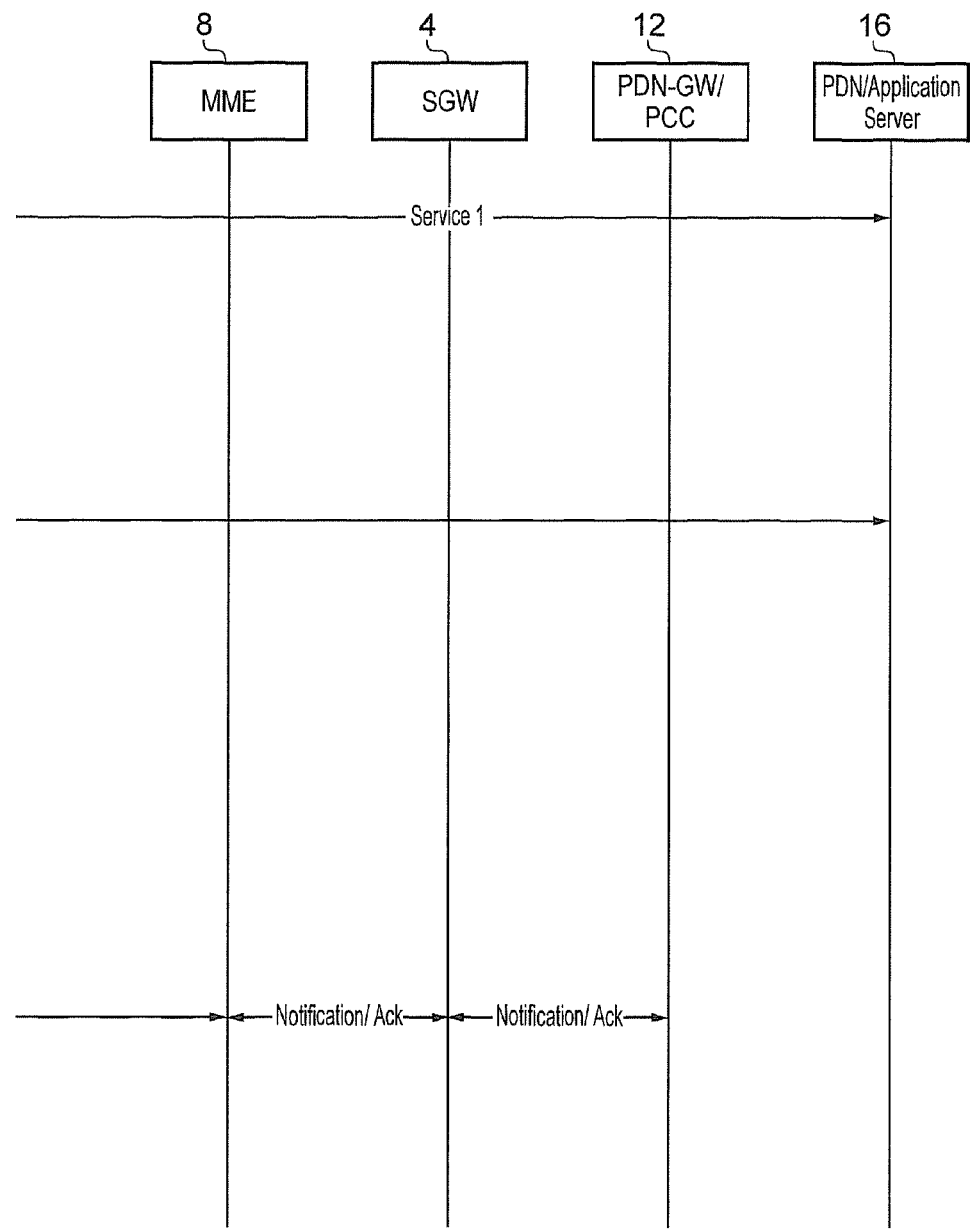
FIG. 9 is a call flow diagram illustrating an example in which a packet inspection entity and a cache controller are part of a base station or local gateway.

The call flow diagram provided in FIG. 9 corresponds to the examples shown in FIG. 8 in which the determination of whether or not to store the content data is triggered in an edge node, but unlike the example shown in FIG. 8, in which content data is uploaded and retrieved from the PDN gateway, the content data is uploaded and retrieved from an edge node and local gateway 32. Using a message exchange M30 the communications terminals 1 request access to the content data from the application server 16 via the PDN gateway 12 and the serving gateway 4. In step S20 the traffic between the communications terminals and the application server is monitored and if triggering conditions are met then it is determined that the content data from the particular source should be cached. If the content data is not currently available as determined by step S24 then in step S26 the local gateway 32 accesses the content data from the application server 16. Through a message exchange M32 the communications terminal 1 requests access to the content data and in step S28 the content data is made available from the edge node which forms a local gateway to access that content data via message exchange M34. Similarly, the content data can be downloaded to the relay node 18 as an edge node, which includes a cache data store 26 for providing access to the same content to other communications terminal via the relay node 18 which is provided by message exchange M36.

Triggers at the Application Server, Content Upload and Retrieval

Figure 10:
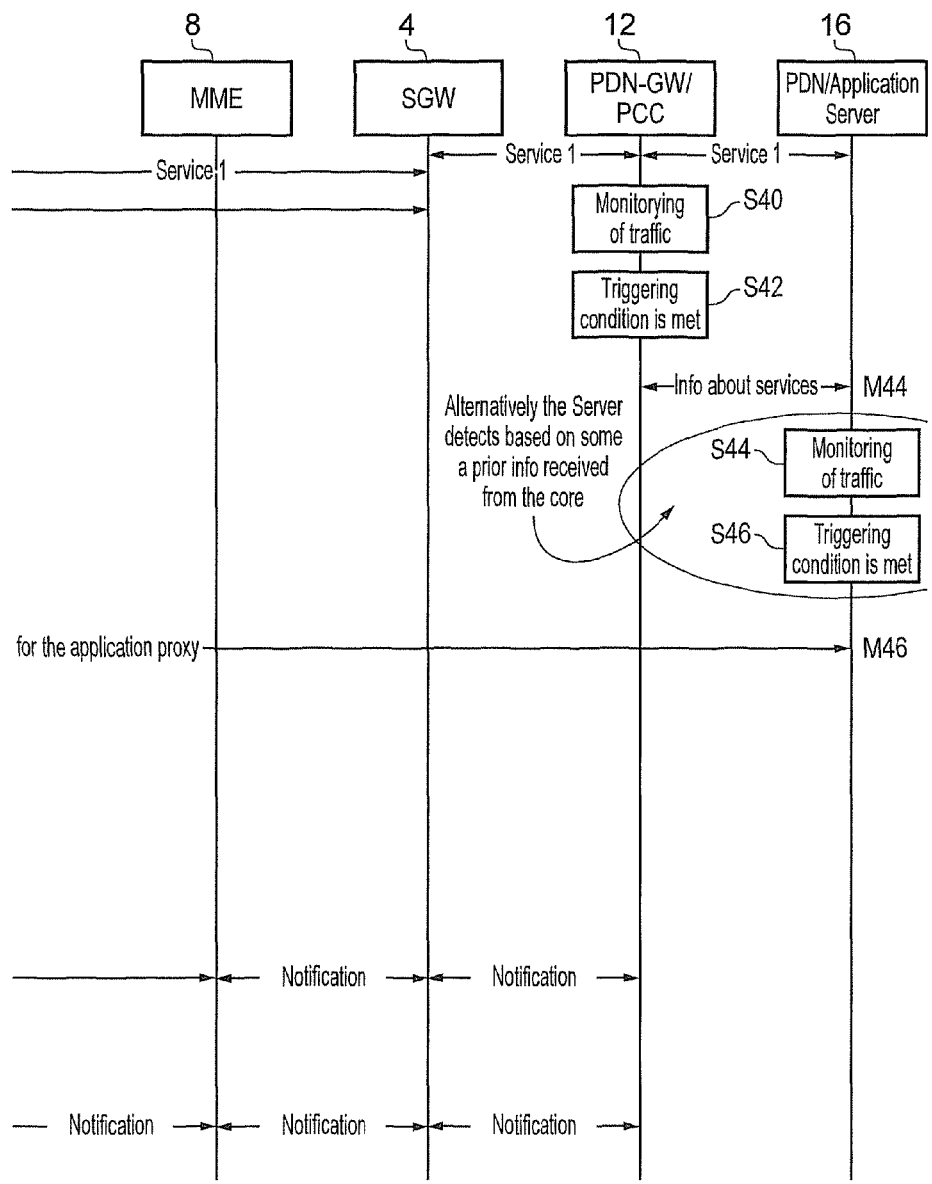
FIG. 10 is a call flow diagram illustrating an example in which a packet inspection entity forms part of an application server.

FIG. 10 provides an example of call flow diagram which corresponds to the examples shown in FIGS. 7, 8 and 9 except that the monitoring of the traffic and packet inspection entity function is provided within the application server 16 and the PDN gateway 12. In this example triggering conditions are determine in an applications server to cache content data locally. This can be notified to an application proxy by the application server. The network may relay the triggering conditions from the applications server. The applications server may also receive an indication from the network that it is desirable to cache the content in the edge node. Alternatively, the applications server can make this detection based on additional information provided by the network operator, for example IP addresses allocated to users meeting some criteria, such as subscription to services, information as to whether the edge node can cache the content, grouping with regard to the edge node, IP addresses handled and services requested etc.

As for the other examples through a message exchange M40 and M42 the communications terminals 1 accesses the content data via the serving gateway 4 on the application server 16. In FIG. 10 the PDN gateway 12 is involved in providing information to the applications server 16 in a step S42 to determine whether conditions for triggering the caching of the content data have been met. Thus, in a message exchange M44 the PDN gateway communicates to the applications server 16 information about services which are being provided to the communications terminals 1.

As shown in FIG. 10, an alternative is provided in steps S44 and S46 which correspond to S40 and S42 except that the monitoring of the traffic and determining whether triggering conditions for caching content data are met performed by the application server 16. If the application server 16 or the PDN gateway 12 in combination with the application server 16 determine that content data should be cached because a number of communications terminals are accessing the content data then using some in band signalling M46 a control message is sent to the relay node 18 that the content data should be cached and the communications terminals which are accessing that content data are identified. Accordingly, in step S48 the relay node caches the content data which is also cached by other base stations such as the eNB 2. As such in steps S50 and S52 the relay node 18 and eNB 2 determine that the content is available so that through message exchanges M48 and M50 the communications terminals are informed that they can access the content data from the relay node 18 or the eNB 2.

In some examples the mobile communications terminal requests the content data as part of a service. In response the edge node does not inform the mobile terminal that the content is cached, but just that the content is provided from the cache. The only indirect indication is when the network is establishing another PDN connection (for all IP flows or just for one IP flow). In this case this is not transparent to the mobile communications terminal.

As will be appreciated, local storage can be implemented by various means such as using an application proxy. Once the decision has been made to store the content at the edge node, the edge node receives and stores the content data. This process maybe substantially invisible to the communications terminal accessing the content.

Figure 11:
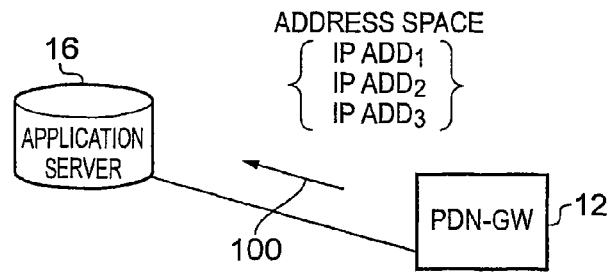
FIG. 11 is a schematic block diagram illustrating parts of a mobile communications network forming an embodiment of the present technique according to FIG. 10.
Figure 12A:
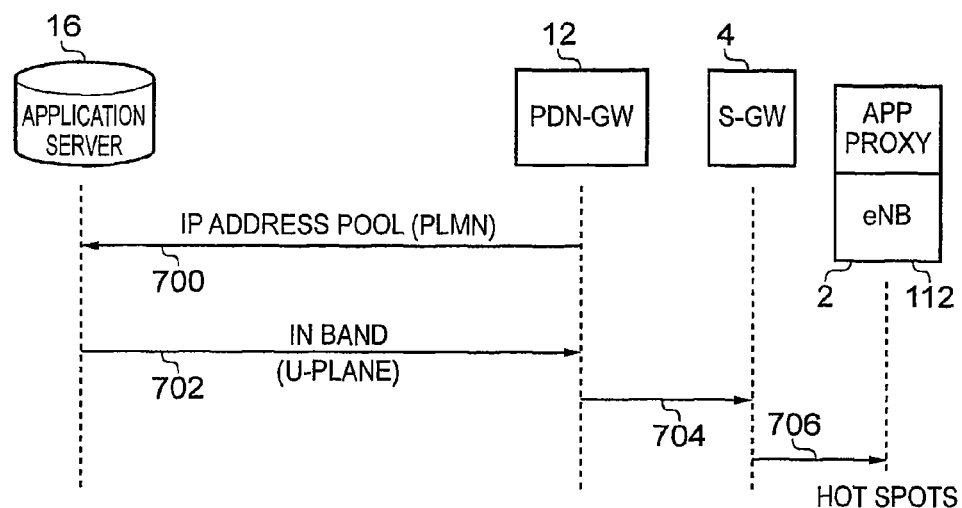
FIG. 12A is a part flow diagram part schematic representation of an operation of elements in accordance with the present technique in which the application server includes a cache controller and/or packet inspection entity in which a decision as to which of the edge nodes (eNode Bs) should cache content is passed to a serving gateway and FIG. 12B provides a corresponding illustration of the operation of the network elements shown in FIG. 12A.

FIGS. 11, 12A and 12 B provide example block diagrams illustrating this example arrangement in which the application server 16 includes a packet inspection entity to determine whether or not the content data which may be accessed by a particular range of communications terminals should be cached. To this end, the applications server 16 receives from the PDN gateway 12 an address space for the communications terminals 1, which may request services from the mobile communications network, for which the PDN gateway 12 forms an interface to the internet protocol network. Thus, in a message 100 the PDN gateway communicates an address space to the application server 16. As shown in FIG. 12A a message exchange is shown in which an IP address pool 700 is communicated from the PDN gateway 12 to the application server 16.

Figure 12B:
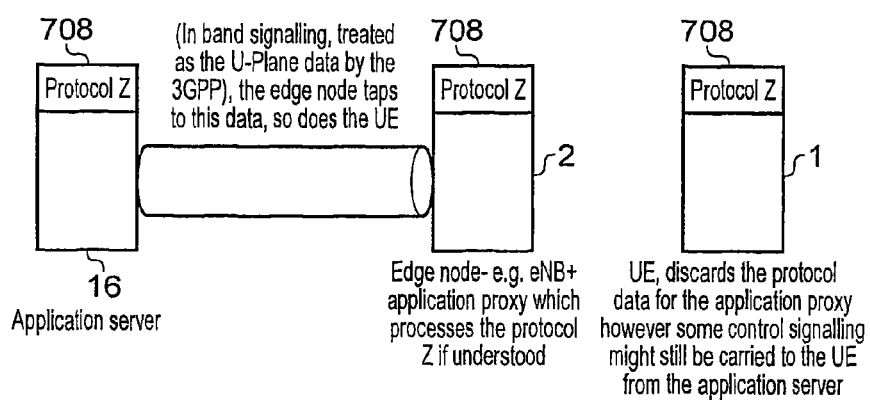

Once the decision has been made to cache the content data from a particular source for communications terminals receiving communications services from the mobile communications network, then using in band signalling, for example, the application server communicates to the PDN gateway that the content data from a particular source should be cached and an indication of a possible range of identified destination addresses of communications terminals which may access that cached content data. Thus as shown in FIG. 12A, using the in band signalling 702, the PDN gateway is provided with information of the content data to be cached and the destination addresses for the content data. However, as explained above the PDN gateway 12 does not have knowledge of which of the base stations have access to a local data store for caching the data content or which communications terminals are accessing the content data and the base stations to which they are attached. Accordingly, as shown in FIG. 12A by further messages 704 and 706 the PDN gateway communicates to the base stations 2, via the serving gateway 4 an indication of communications terminals which are accessing the content data from the source of that content data, with an indication of the content data which should be cached. Effectively therefore, as shown in FIG. 12B, a protocol stack on the application server and the base station are exchanging higher layer protocol messages indicated as a protocol layer Z 708 for controlling the access to the content data from the local data store.

An identification of services which are provided to the mobile communications terminals may be made using meta data which includes information such as: URL, server IP address, port number, content type, protocol type for example http, RTP etc., validity period, tag information, local node identity (optionally)). This may be used in the network to identify the cached content data in order to manipulate it. This may be used to allow a service provider to manage the content data once it has been cached.

Content Modification (Update/Delete)

Figure 13:
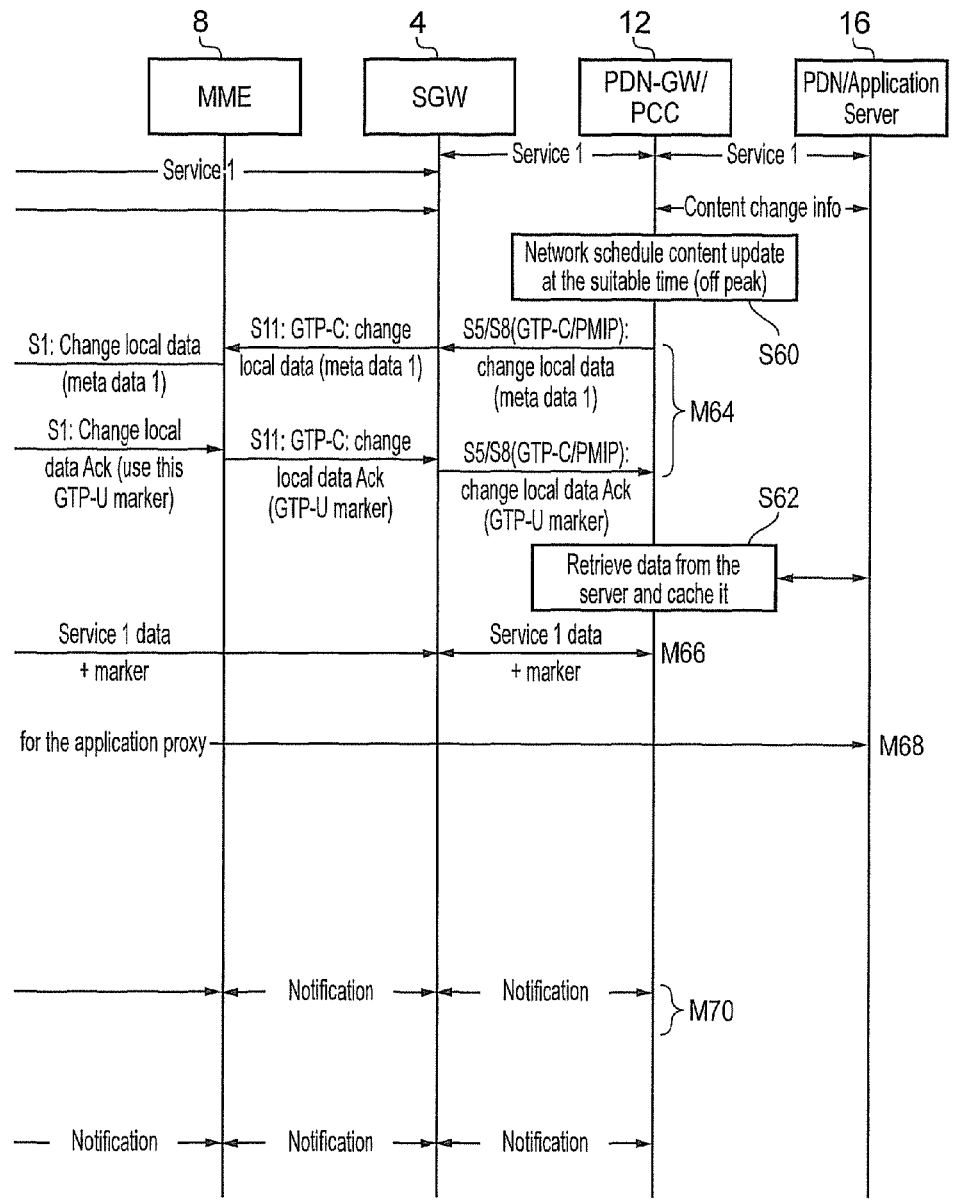
FIG. 13 is a further call flow diagram illustrating an operation in which an item of content data is updated from a version of the content data item in a local data store after the content data on a remote application server has changed.

FIG. 13 provides a call flow diagram illustrating a process of updating the content data which has been cached but which may change periodically and is therefore updated by the application server. In a message exchange M60 and M62 the communications terminals 1 access the content data from the application server 16. In a service step S60 the PDN gateway 12 schedules an update of the content data which is stored on a local data store of an eNB 2 acting as an edge node. Thus, via a message exchange M64, the update of the content data is communicated to the base station 2 so that in a step S62 the content data is retrieved from the application server 16 and cached by communicating content data to the eNB 2 via a message exchange M66. Thus, at step S64 the content data is now available for communication to the communications terminals 1.

As an alternative via a message exchange M68 the application server 16 can update the content data in the relay node for example or the base station 2 acting as edge nodes using in band signalling. As such, the content data becomes updated via in band signalling in step S66 and is then available is step S68. A message exchange M70 issued for the AAA purposes and not to upload the content. In S68 and S70, it is assumed that the content is already available at the edge nodes, although for S68 the content has been uploaded via the message exchange M68. Using this example of the present technique the content data can be managed and updated/removed. As explained this management can be effected by the Application Server using in-band signalling or by the PDN-gateway.

Switching Between Cached Content Data and Local Content Data

Embodiments of the present technique described above provide examples of triggering conditions for caching service or content data by for example a packet inspection entity. The cache controller than provides access to the cached content. According to the present technique a mobile communications network is adapted to provide access to content data from a local data store or cache rather then from an application server remotely. In order to be able to provide access to the content data locally from an edge node, the edge node is required to do the following steps:

Intercept the service or content data request.

Verify whether the content data requested is locally available. This may be typically realized by applying matching filters against database with meta data describing the cached content data. The meta data includes information such as: URL, server IP address, port number, content type, protocol type e.g. http, RTP etc., validity period, tag information, local node identity (optionally)). This is used in the network to identify the cached content.

Switch the source of data.

The switching cannot be done at the PDN connection and bearer establishment time because it is not known at this stage which service or content data the user is going to request, unless the PDN connection and bearers are established solely for the purpose of content data retrieval and then once the service data has been delivered, the bearers terminated. However this is not realistic given the additional control-plane signalling which is required per content request and access. Therefore dynamic measures are required in order to switch the service data when the network discovers that the user has requested the content which is locally stored.

According to the present technique one or more elements within the mobile communications network includes a cache controller which operates to perform the steps of the discrimination process at the local node or edge node which is shown in FIG. 14 and summarised as follows:

S80: From a start of the process data packets are monitored by a packet inspection entity as explained above which intercepts transmission of the content data and receipt of request for content data items from a particular source in step S82.

S84: In step S84 the cache controller determines whether the content data which has been requested is available locally on a local data store or cache which is associated for example with the edge node (for example a base station or relay node). If the local content data is not available then flow returns to step S82 and this process continues with the packet inspection entity to determine whether or not content data should be cached as explained above.

S86: If the requested content data is available locally on the local data store of the edge node then the edge node switches the access to the content data from the local data store.

S88: In step S88 the data is supplied to the communications terminal from the local data store and in step S90 the cache controller determines whether more content data is required and continues to supply the content data and if not then control flows back to the start S80.

In correspondence with the examples explained above with reference to FIGS. 3 and 4 which show the high level architectural difference between a network operating to provide content data to a communications terminal via a SIPTO technique or the LIPO technique, FIGS. 15 and 16 illustrate a more detailed example of how the SIPTO and LIPO techniques can be implemented. There are some similarities as well as differences between these two example options.

In FIG. 15 parts of a mobile communications network which implement a SIPTO access to web content is illustrated. As shown in FIG. 15 communications bearers 100, 102 provide access to content data which may be available from a remotely located applications server 104. However as explained below the content data is provided instead from a local cache 26.

In FIG. 16 the LIPO technique is illustrated to include a local data store 26 which is accessed by a local gateway 32 via an eNB 2. The local gateway 32 is connected by a S5/S8 interface to a serving gateway 4 and the eNB 2 is connected via interface S1 to the serving gateway 4. As for example shown in FIG. 15 a remotely located server 110 is provided which is conventionally arranged to communicate the content data to a mobile communications terminal via the eNB 2. However, as shown in FIG. 16 the content data is stored locally on the data store 26 and accessed via the local gateway 32. Further examples of the SIPTO technique for switching the access to the content data from a remote server to a local cache are described as follows:

SIPTO Technique

According to the present technique, once the communications terminal has established a PDN connection with at least a default bearer to the PDN gateway managed by the operator, the communications terminal may then request a content data item which has been cache as a copy in a local data store of an edge node via which the communications terminal has attached to the mobile communications network. Embodiments of the present technique can provide an arrangement for switching the access to the content data from the remote server to the locally stored copy on the edge node which forms a local gateway, once a decision has been made to do so. The question is how the system switches over? Several options are possible. They are presented below:

Connection switching: The PDN gateway used for the PDN connection which the communications terminal has established to access the content data needs to be switched over to the local gateway; this is only for the IP flow used to retrieve the content, for all other IP flows the legacy/old P-GW and the PDN connection is used, the P-GW may gate/block the flow which was switched over to the edge node.

Triggered new PDN connection/bearer setup: Alternatively a new PDN connection is created and the default bearer/other bearers are established and the communications terminal is told to use the bearers for the content retrieval. They could be implicitly released after some period of inactivity. The original PDN connection/bearers are kept intact but the communications terminal is triggered by the network. This solution avoids the need to use mirrored local protocol stacks as the communications terminal creates new instances of them.

User-plane data insertion: The eNB intercepts the communications terminal's request and forwards its local data to the communications terminal feeding this information straight to the communications terminal.

As will be appreciated, the cache from the local gateway or edge node provides the content, but virtual instantiation of protocol stacks might also be required in some scenarios if they hold some state information e.g. TCP instantiation keeps connection information. This is required to keep the communications terminal side unaware of content switching. There are three variations of using the SIPTO technique, which are described in the following paragraphs with reference to FIGS. 17, 18 and 19, which provide three example call flows which describe examples of accessing content data using an SIPTO technique.

Figure 17:
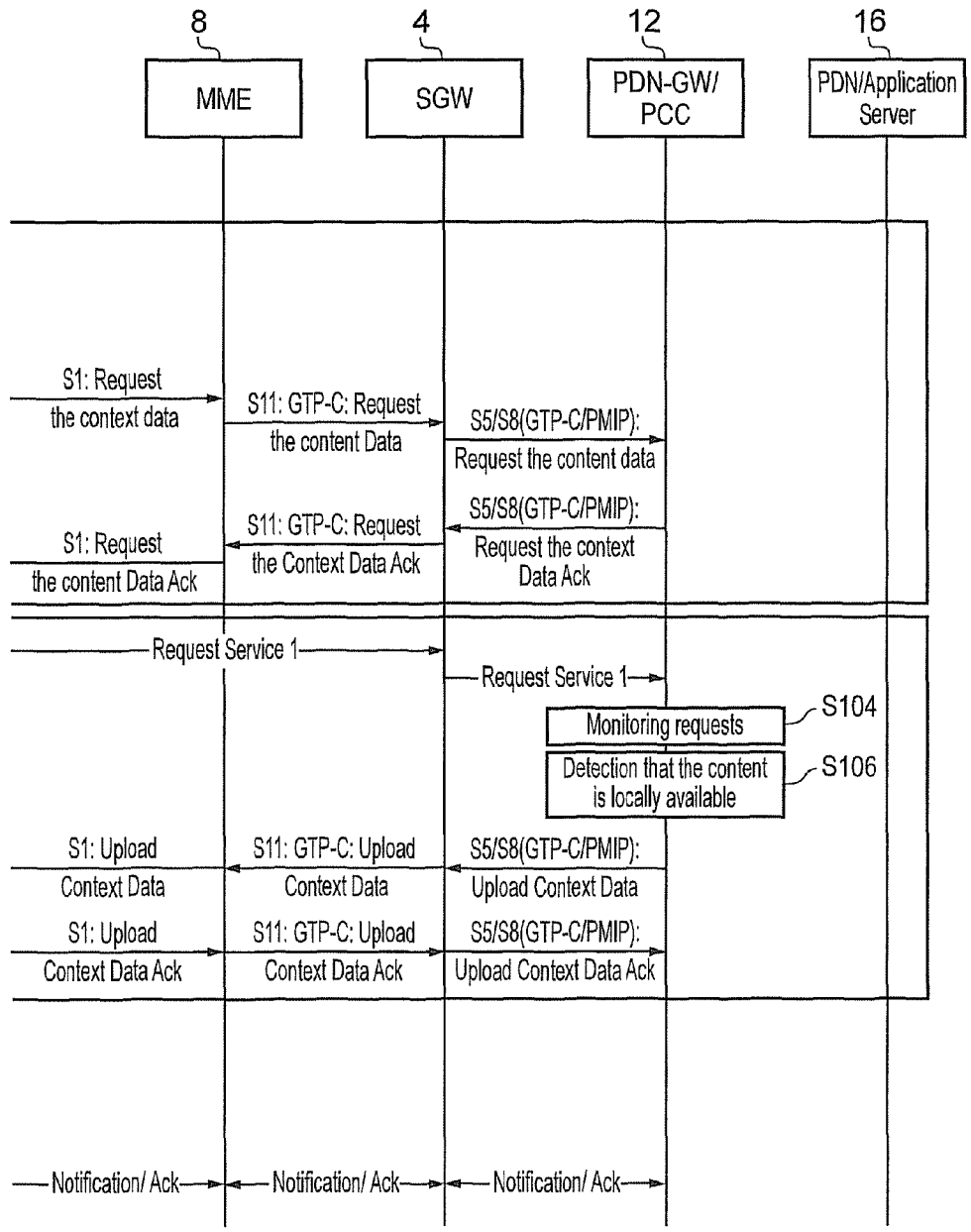
FIG. 17 is a call flow diagram illustrating an access to content data in accordance with a connection switching example using the SIPTO technique.

Connection Switching:

For the first example presented in FIG. 17, the edge node detects that the content data requested by the communications terminal is available in an associated local data store and notifies the network accordingly and stops the network from processing the request from the communications terminal and supplying the content data from a remotely located source (applications server). A virtual local gateway is instantiated for a local PDN connection with the protocol stacks mirrored and the content data provided from the local cache. This is only for the IP flow (s) used to retrieve the content data. Thus, in FIG. 17 through a message M100 a communications terminal 1 requests access for the content data from a particular source from a local gateway 120.

FIG. 17 provides two alternative arrangements A and B for delivering the content data depending on whether the monitoring of requests for content is performed within the eNB local gateway 120 or the PDN gateway 12. In the first arrangement A, in a step S100 a monitoring of requests takes place in the eNB/local gateway 120 and in a step S102 the eNB/local gateway 120 determines whether the local content is available from the local data store or cache 26. Using a message exchange 102 the PDN gateway is then consulted as to whether the content data can be provided to the communications terminal from the local data store, and requested the PDN information in order to instantiate a local PDN-GW just for the IP flow(s) used to retrieve the content data In this example the eNB acting as an edge node becomes a local gateway for controlling access to the content data using an internet protocol.

In the second alternative arrangement B the request to access the content data is communicated via a message exchange M104 to the packet data gateway 12 which is monitoring requests in step S104 to detect whether the content is available locally from the eNB/local gateway 120 in steps S104 and S106. Using a message exchange 106 the PDN context data is uploaded to the local gateway 120 for access by the communications terminal 1. This is to enable in step S108 the instantiation of a mirrored PDN connection in the eNB/local P-GW for the relevant IP flow(s) to provide access to the content data from the local data store to the communications terminal 1 as if the content data was accessed from the applications server 16. In step S110 mirrored protocol stacks are created and through a message exchange M110 the service data is provided from the local gateway and the PDN gateway is informed.

Figure 18:
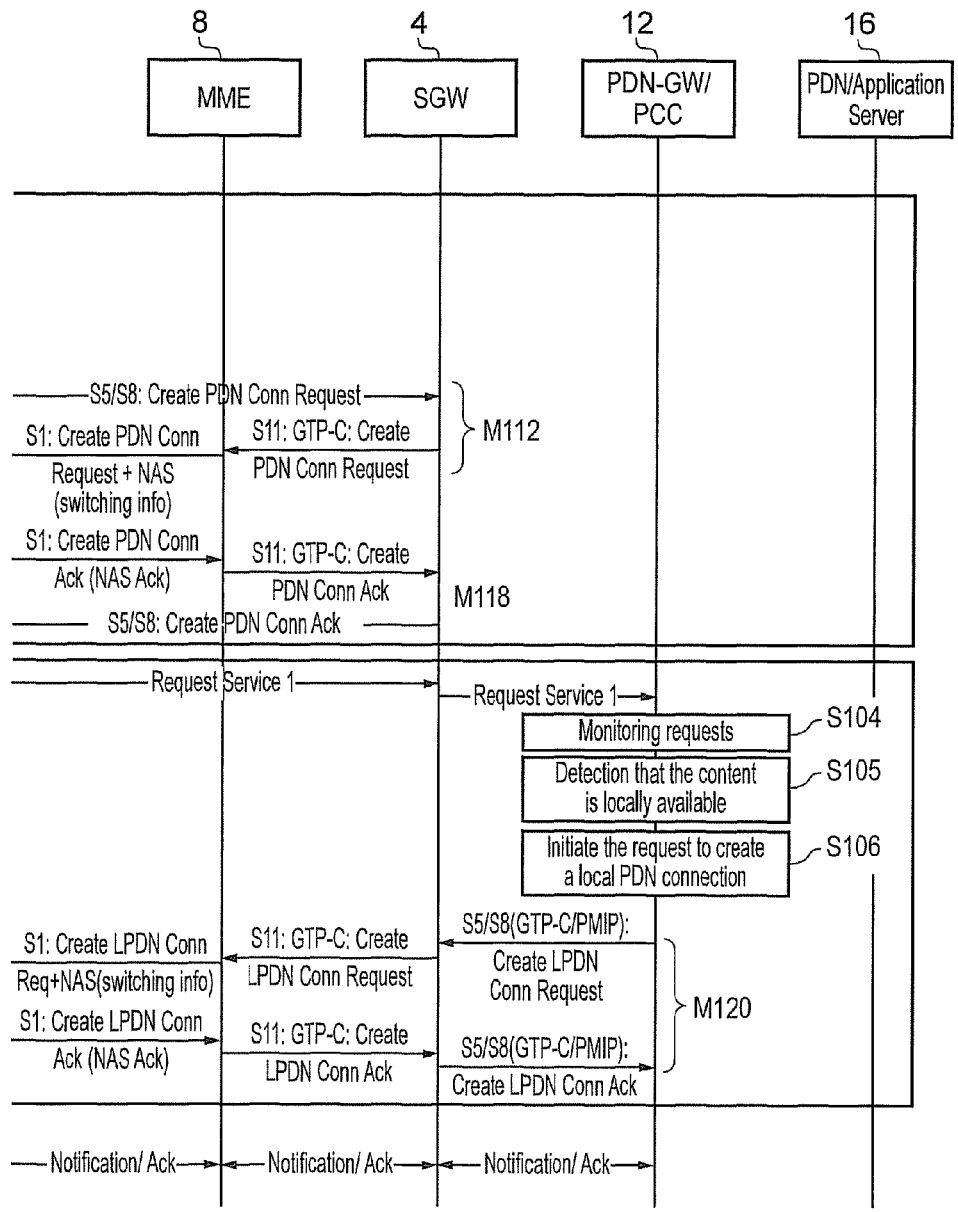
FIG. 18 is a call flow diagram illustrating an example in which a new PDN/communications bearer is established when accessing the content data using the SIPTO technique.

Triggered New PDN/Bearer Establishment:

The call flow for a SIPTO access to the locally stored content data for an example in which a new PDN connection and bearer(s) are established is shown in FIG. 18, which corresponds substantially to the call flow shown in FIG. 17 except that a new communications bearer(s) and PDN connection is established for communicating the content data. Thus, only the differences will be described (please note that a bearer may carry one or multiple IP flows).

In FIG. 18 the edge node which detects that the communications terminal request pertains to a content data item which is cached notifies the network and requests that a new PDN connection/bearer be created at the edge node. The communications terminal is notified that the new parameters to access the content data need to be used, for example the IP address etc and that the content will be provided on a different PDN connection. The communications terminals may resend the service request on this new PDN connection over a newly established bearer. The communications terminal may optionally send another request which is handled by the eNB acting as a local gateway by accessing the cached information. This solution avoids a need to use the mirrored local protocol stacks as the communications terminal creates new instances of them. This solution is less transparent to the communications terminal.

As shown in FIG. 18 in a message step S112 the edge node forms a IP local gateway 110, which initiates a request to create a PDN connection from the serving gateway 4 via a message exchange M110 with the serving gateway 4 which causes a re-configuration request to be sent to the communications terminal via a message M114. In a message 116 an acknowledgement is sent which is confirmed with the serving gateway 4 by a message exchange 118. Correspondingly, once the content data has been provided to the local gateway 120 then for alternative arrangement B the message exchange M118 is provided to re-configure the communications bearer with the communications terminal 1 to deliver the content data from the edge node which forms a local gateway.

Figure 19:
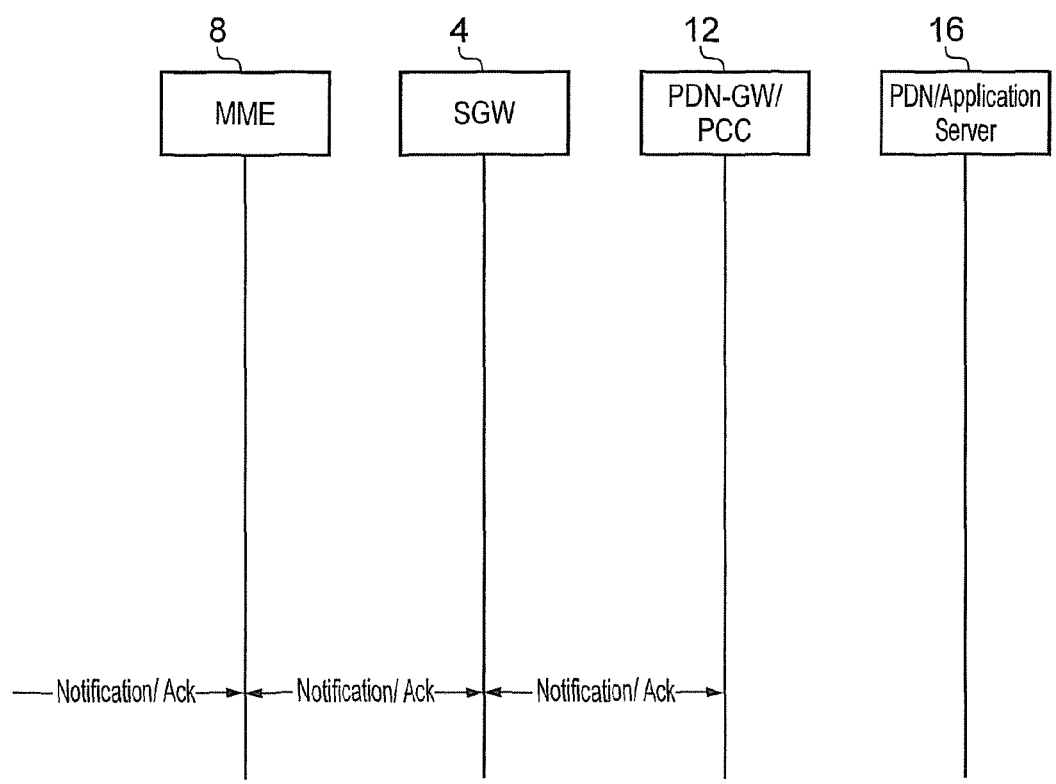
FIG. 19 is a call flow diagram illustrating an operation in which content data is accessed using user plane data insertion for the example of the SIPTO technique.

U-Plane Data Insertion:

FIG. 19 provides a further example in which the edge node is formed from eNB/local gateway 120, which mirrors the protocol stacks which would be provided within the PDN gateway or the application server. The mirrored protocol stacks serve to insert the local data into the data packets for communication to the communications terminal as if these were communicated from the application server 16. As such this solution is more transparent to the communications terminal and the network. The edge node which detects that the request from the communications terminal pertains to content data which is cached intercepts the request and does not forward it further. A local instantiation of protocol layers is used and the locally cached copy of the content data communicated using bearers which have already been configured for the communications terminal. The up-link traffic related to the content data is also intercepted at the edge node. This solution is transparent of the communications terminal.

As shown in FIG. 19, in step M120 the local gateway instantiates a mirror protocol stack to mimic the operation of the protocol stacks within the serving gateway PDN gateway or application server. At step S122 the local content is provided in data packets which are destined for the communications terminal by inserting the data from the local data store into these packets.

LIPA Technique

There are two possible alternative variations for using the LIPA technique which are Using a triggered new PDN connection/bearer setup: A new PDN connection is created and the default bearer/other bearers are established and the communications terminal is told to use them for the content retrieval. They could be implicitly released after some period of inactivity. The original PDN connection/bearers are kept intact but the communications terminal is triggered by the network. This solution avoids the need to use the mirrored local protocol stacks as the communications terminal creates new instances of them.

User-plane data insertion: The LIPA access is configured for the local user. The local node intercepts the communications terminal requests, for example by monitoring the user-plane traffic and searching for pattern match for some requests types. Once the match is found the local node provides the data from its local storage/cache to the local gateway terminating communications terminal requests.

These two alternatives for the LIPA technique are explained in more detail below:

Triggered New PDN Connection/Bearer Establishment.

Figure 20:
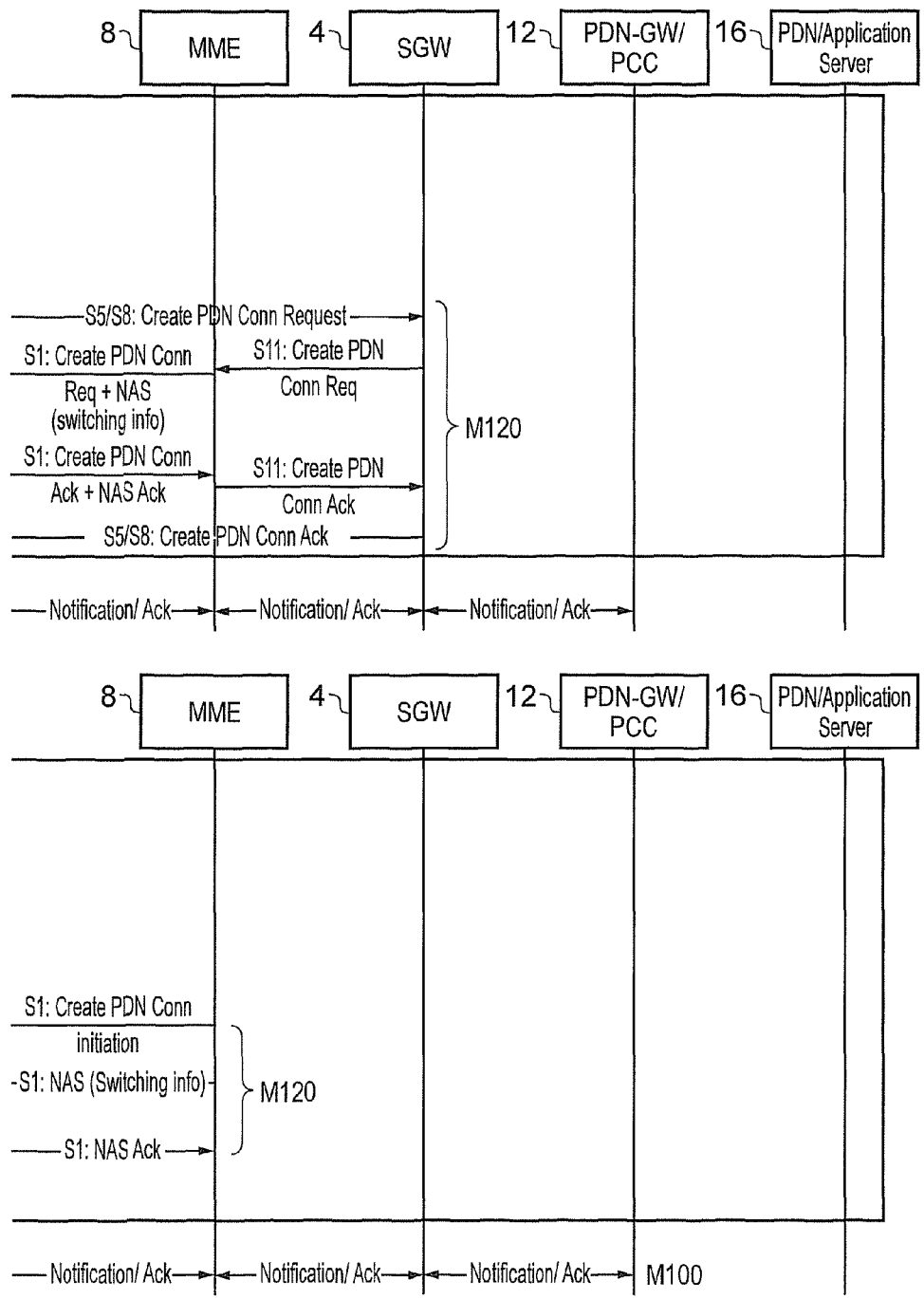
FIG. 20 is a call flow diagram in which the content data is accessed by establishing a new PDN communications bearer using the LIPA technique.

FIG. 20 provides a call flow diagram which represents the operation of a LIPA technique for providing the content data from a local data store to the communications terminal. The call flow corresponds to that explained above for FIGS. 17, 18 and 19 and so only the differences will be described.

As for the examples shown in FIG. 18 and in FIG. 20, respectively, a step S106 or S104 is performed to initiate a request to create a PDN connection with the communications terminal to connect the communications terminal to the local gateway, which is formed from the edge node, or more particularly to receive the local content from the local data store. Thus, in a message exchange M120 a request for re-configuring the radio resource connection is exchanged with the communications terminal 1 which provides a PDN communications bearer to the local gateway for accessing content data. Once a trigger comes from the local gateway then a create PDN connection request is received which is forwarded to the MME. The MME processes this data updating session context information management and forms NAS message to provided switching information to the mobile terminal. As such the MME provide secure NAS communications which is integrity protected (may be encrypted), which cannot be altered by the eNodeB. In the second part of FIG. 20, because the local gateway and the eNode B are co-located, the local gateway communicates via an internal interface to the eNode B the request for a PDN connection. This request is sent to the MME via the S1 interface. The MME performs a similar function as for the first part.

U-Plane Data Insertion:

Once the triggering condition has been met, and the content data has been stored locally, the edge node, which forms a local gate way is required to monitor the communications terminal traffic in order to detect whether some content data can be supplied from the local cache/store for delivery to the communications terminal. This process should be transparent to the communications terminal, because the communications terminal can receive the content data on the same bearer.

A legacy user-plane protocol stack architecture in the LTE/EPC is presented in FIG. 21, which provides an example of an end to end protocol architecture for an LTE EPC connection. FIG. 22 provides an arrangement which is adopted when the local storage of content data has been made within a local data store so that the content data is provided from the local or edge node. In FIG. 22 it can be seen that elements within a box 130 are adapted to provide the local data from the local data store 126. As can be seen in FIG. 22 the application service data is provided via mirroring protocols from the communications terminal 132 which is correspondingly reflected by the protocols within the cache data store of the local gateway 134. The protocols in the local data store of the local gateway 136 are provided to mirror the application service data and protocols 140 within the application server 116.

In this example the cache must not only provide the content data but also the protocol stacks must be instantiated to make sure that accessing the locally stored content data is invisible to the communications terminal. There is a need for logic components at the local node that search for matching patterns in service requests coming from the communications terminal. This is required to detect whether the communications terminal can be supplied with content data which is locally available. In addition the local entity is required to mirror remote protocol stacks below application layer. This can be realized by transparently forwarding the lower layer protocol data. This allows the local node to collect information about protocol stacks in order to be able to instantiate the mirrored protocols. Once the filter matches the pattern, the local node can transparently switch the service data source as well as switching over to local instances of the protocol stacks.

Protocol mirroring is shown in more detail in FIG. 23 where parts corresponding to those shown in FIG. 22 have the same numerical designations. As can be seen in FIG. 23 the local gateway provides mirroring protocols which map to the protocols present in the application server to provide an arrangement in which the content data is provided from the local data store rather than remotely from the application server 116. The corresponding arrangement is also shown in FIG. 24 for local service data delivery once the protocols have been mirrored within the local gateway and the communications terminal 1.

Figure 25A:
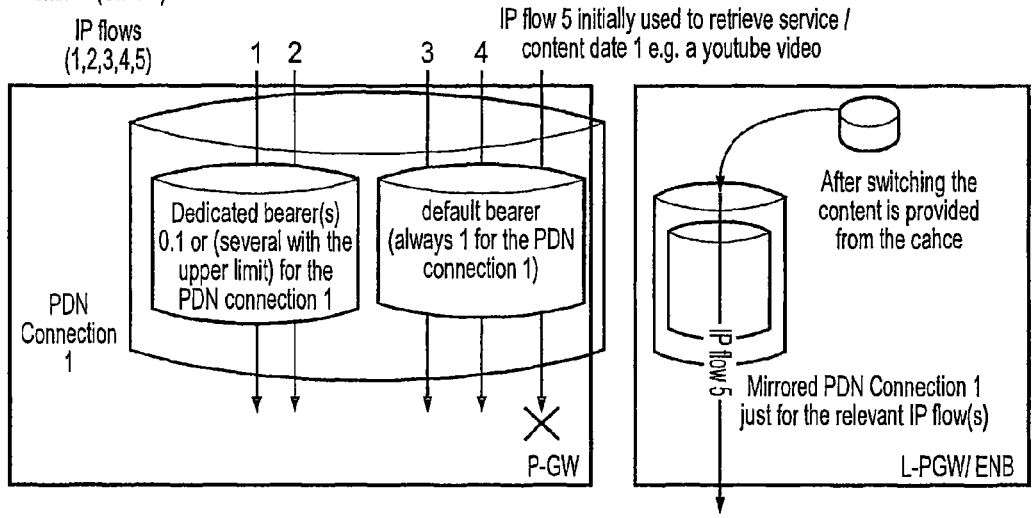
FIGS. 25A and 25B provide schematic block diagrams illustrating a difference in the operation of SIPTO and LIPA when switching content to be accessed from a local data store.
Figure 25B:
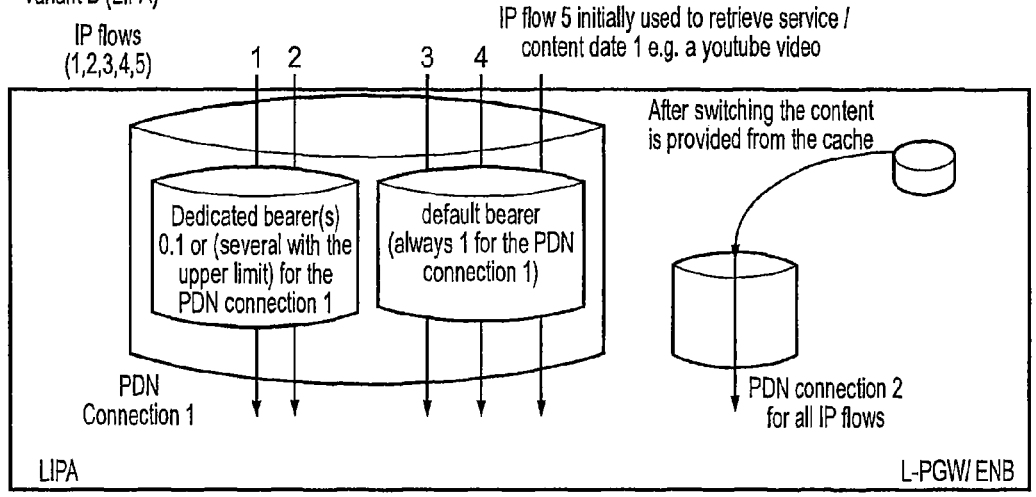

As a further illustrative example of the present technique FIG. 25A a representation of the operation of a network which is arranged to switch access to a content data item from a remote server to a local data store using the SIPTO technique. As shown in FIG. 25A the local packet data gateway formed from an eNode B, L-PGW/eNB is shown separately from the packet data gateway. In this example, one of the IP connection, IP flow 5, is used to mirror PDN connection 1 via which the content data is retrieved from the local data store. In the example shown in FIG. 25B the LIPA technique is used. In the example of FIG. 25B the local packet data gateway formed from an eNode B is shown to switch access to the content data item from the cache by switching access from PDN connection 1 to PDN connection 2.

Figure 26A:
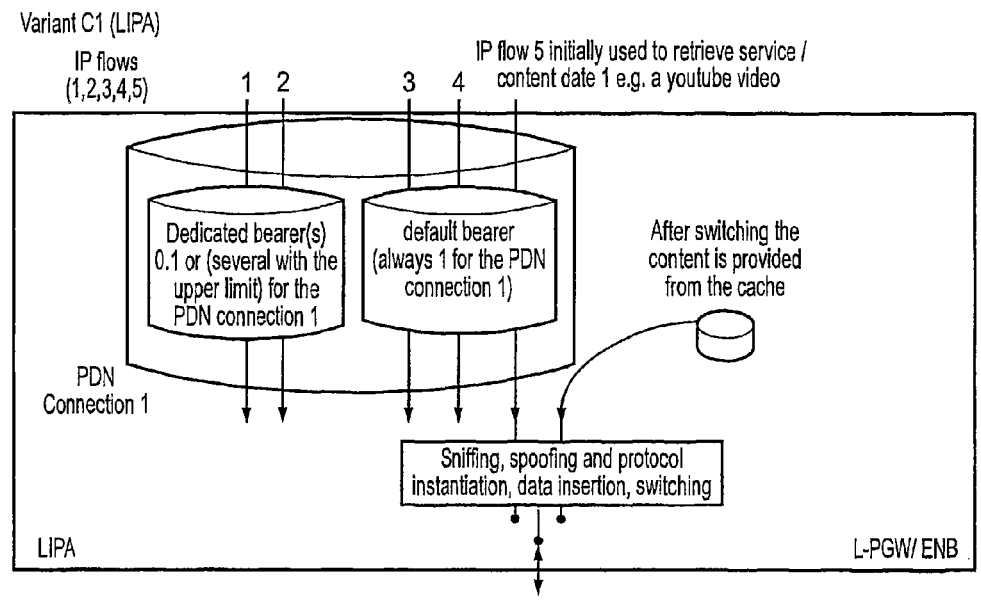
FIGS. 26A and 26B provide schematic block diagrams illustrating a difference in the operation of SIPTO and LIPA when using protocol mirroring.
Figure 26B:
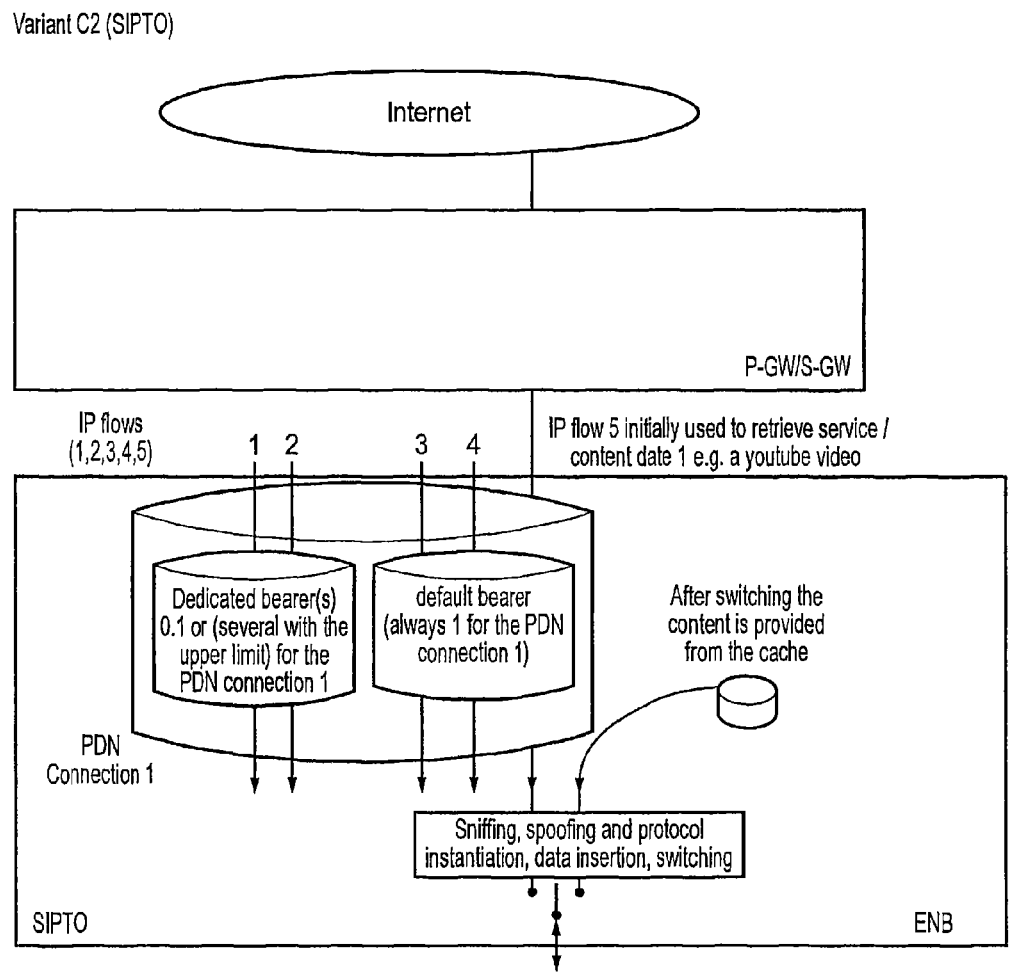

In further examples illustrated in FIGS. 26A and 26B, LIPA and SIPTO are used to switch access to the local content using protocol sniffing, spoofing, protocol instantiation, data insertion and switching. As shown in FIG. 26A, illustrating the LIPA example, an IPflow 5 is used to retrieve the content data and after switching, the content is accessed from the local cache in the L-PGW/eNB using protocol spoofing. In contrast in FIG. 26B, for the SIPTO example, the eNode B which includes a cache uses the packet data gateway and serving gateway to retrieve content data and then to spoof, to mirror the protocols and the to insert the data so as to switch the content data from the local data store as if the content were accessed from the applications server.

Various further aspects and features of the present invention are defined in the appended claims. Various modifications may be made to the embodiments described above without departing from the scope of the present invention. For example, embodiment of the present invention finds application with other types of mobile communications networks and is not limited to LTE. Although the functional operation of triggering the caching of the content data and providing access to the cached content data have been assigned in the above description to a packet inspection entity and a cache controller, it should be appreciated that these are just illustrative examples and this functionality could be located in different entities in any part of the network with appropriate adaptation as explained above. The present application benefits from the Paris Convention priority from GB1115746.8 and GB1115745.0 the contents of which are incorporated herein by reference.

The invention claimed is:

1. A communications terminal for receiving content data via data packets from a mobile communications network, the mobile communications network including a core network part having a plurality of infrastructure equipment, and a radio network part including at least one base station for providing a wireless access interface to communicate the data packets to the communications terminal, the at least one base station including a local data store having stored therein content data, which has been received from an applications server external to the mobile communications network via the core network, the communications terminal comprising:
   circuitry configured to:
      communicate a request to access content data of the applications server, and
      receive the content data, which has been inserted into the data packets at the at least one base station, from the local data store of the at least one base station rather than from the applications server based on protocol mirroring between the communications terminal and the at least one base station.

2. The communications terminal as claimed in claim 1, wherein the circuitry is configured to establish at least a facility for communicating control plane signaling via the mobile communications network, and consequent upon detecting that the content data is stored in the local data store to receive the content data as user plane data.

3. The communications terminal as claimed in claim 2, wherein the content data is communicated as user plane data over a packet data network connection, the packet data network connection providing at least a default bearer.

4. The communications terminal as claimed in claim 2, wherein the circuitry is configured to establish a packet data network connection, the packet data network connection providing a default bearer and at least one dedicated bearer and the content data is communicated as user plane data via the at least one dedicated bearer.

5. The communications terminal as claimed in claim 1, wherein the circuitry is configured to:
   access the applications server via a packet data network gateway using a first access point name, and
   receive a redirection message, the redirection message providing a second access point name of a local packet data network gateway from which the content data is accessed from the local data store.

6. The communications terminal as claimed in claim 5, wherein the local packet data network gateway includes a proxy server for providing access to the content data on the local data store, and the circuitry is configured in response to the redirection message to establish a communications bearer and a packet data network connection to the proxy server via the local packet data network gateway for receiving the content data from the local data store.

7. The communications terminal as claimed in claim 1, wherein the circuitry is configured to
   receive signaling messages in accordance with a communications protocol from the core network part or the radio network part rather than from a packet data network gateway through which the applications server is accessible from the mobile communications network, and
   receive the content data from the local data store of the at least one base station rather than from the applications server.

8. The communications terminal as claimed in claim 1, wherein the circuitry is configured to establish in combination with the packet data network gateway a bearer context information for a local gateway providing access to the content data from the local data store.

9. The communications terminal as claimed in claim 1, wherein the circuitry is configured to receive a destination address of the local gateway.

10. The communications terminal as claimed in claim 1, wherein the circuitry is configured to receive the content data stored in the local data store from the at least one base station by identifying at least one of a destination address, a port number, and access point name of the packet data network gateway via which the applications server is accessible.

11. The communications terminal as claimed in claim 1, wherein the content data is communicated to the communications terminal from the local data store using one of a Local Internet Protocol Access or a Selected IP Traffic Offload protocol.

12. The communications terminal as claimed in claim 1, wherein the content data is received from the local data store based on switching to the protocol mirroring between the communications terminal and the at least one base station.

13. A method of receiving content data via data packets at a communications terminal from a mobile communications network, the mobile communications network including a core network part having a plurality of infrastructure equipment, and a radio network part including at least one base station for providing a wireless access interface to communicate data packets to or from communications terminals, the method comprising:

providing in the at least one base station a local data store having stored therein content data, which has been received from an applications server external to the mobile communications network via the core network, transmitting, using the communications terminal, a request to access content of the applications server, based on identification that the content data is stored in the local data store, receiving the content data, which has been inserted into the data packets at the at least one base station, at the communications terminal from the local data store of the at least one base station rather than from the applications server, wherein said receiving the content is based on protocol mirroring between the communications terminal and the at least one base station.

14. The method as claimed in claim 13, wherein said receiving the content data from the local data store is based on switching to the protocol mirroring between the communications terminal and the at least one base station.

15. A communications terminal for receiving content data via data packets from a mobile communications network, the mobile communications network including a core network part having a plurality of infrastructure equipment, and a radio network part including a plurality of base stations for providing a wireless access interface to communicate the data packets to the communications terminal, the radio network part including a local data store having stored therein content data, which has been received from an applications server external to the mobile communications network via the core network, the communications terminal comprising:

circuitry configured to:

communicate a request to access content data of the applications server, and receive the content data, which has been inserted into the data packets at the radio network part, from the local data store of the radio network part rather than from the applications server based on protocol mirroring between the communications terminal and the radio network part including the local data store.

\* \* \* \* \*